(12) United States Patent
Kubota et al.

(10) Patent No.: US 8,745,874 B2
(45) Date of Patent: Jun. 10, 2014

(54) METHOD OF MANUFACTURING WHEEL SUPPORT BEARING ASSEMBLY

(75) Inventors: Kazunori Kubota, Iwata (JP); Kazuo Komori, Iwata (JP); Hiroshi Matsunaga, Iwata (JP); Akira Fujimura, Iwata (JP); Tetsuya Hashimoto, Iwata (JP); Masahiro Kiuchi, Utsunomiya (JP)

(73) Assignee: NTN Corporation, Osaka (JP)

( * ) Notice: Subject to any disclaimer, the term of this patent is extended or adjusted under 35 U.S.C. 154(b) by 19 days.

(21) Appl. No.: 13/467,524

(22) Filed: May 9, 2012

(65) Prior Publication Data

US 2012/0216407 A1 Aug. 30, 2012

Related U.S. Application Data

(62) Division of application No. 12/086,000, filed as application No. PCT/JP2006/323557 on Nov. 27, 2006, now abandoned.

(30) Foreign Application Priority Data

| Dec. 5, 2005 | (JP) | 2005-350479 |
| Jan. 12, 2006 | (JP) | 2006-004978 |
| Jan. 19, 2006 | (JP) | 2006-010702 |
| Jan. 30, 2006 | (JP) | 2006-021042 |

(51) Int. Cl.
*B21D 53/10* (2006.01)

(52) U.S. Cl.
USPC .................... 29/898.042; 384/544

(58) Field of Classification Search
CPC ........... B60B 27/0005; B60B 27/0084; B60B 27/0094; F16C 19/186; F16C 43/04
USPC ........ 29/898.042–898.059; 384/544
See application file for complete search history.

(56) References Cited

U.S. PATENT DOCUMENTS

| 4,887,917 A | 12/1989 | Tröster et al. |
| 4,893,960 A | 1/1990 | Beier et al. |
| 5,226,738 A | 7/1993 | Valette et al. |

(Continued)

FOREIGN PATENT DOCUMENTS

| DE | 3418440 A1 | 11/1985 |
| EP | 1588868 A1 * | 10/2005 |

(Continued)

OTHER PUBLICATIONS

Fourth Chinese Office Action issued Oct. 31, 2012 in related Chinese Patent Application No. 200880002237.6.

(Continued)

*Primary Examiner* — David Bryant
*Assistant Examiner* — Jacob Cigna

(57) ABSTRACT

A method of manufacturing a wheel support bearing assembly having a plastically deformed portion engageable with an inclined surface portion of an annular stepped area in the inner race segment. The method includes that the plastically deformed portion, which is of a cylindrical configuration before it is deformed, is formed by pressing a crimping punch, of which front end portion outer peripheral surface is a tapered shape, axially into an inner peripheral surface of the inboard end portion of the hub axle to allow the cylindrical plastically deformed portion to be crimped in the diameter expanded condition.

14 Claims, 15 Drawing Sheets

(56) References Cited

U.S. PATENT DOCUMENTS

| | | | |
|---|---|---|---|
| 5,975,765 | A | 11/1999 | Kawamura |
| 6,022,275 | A | 2/2000 | Bertetti |
| 6,105,251 | A | 8/2000 | Payen |
| 6,280,096 | B1 | 8/2001 | Miyazaki et al. |
| 6,422,758 | B1 | 7/2002 | Miyazaki et al. |
| 6,485,187 | B1 | 11/2002 | Meeker et al. |
| 6,497,515 | B1 | 12/2002 | Sahashi et al. |
| 6,524,011 | B2 | 2/2003 | Miyazaki et al. |
| 6,574,865 | B2 | 6/2003 | Meeker et al. |
| 6,575,637 | B1 | 6/2003 | Tajima et al. |
| 6,585,420 | B2 | 7/2003 | Okada et al. |
| 6,672,679 | B2 | 1/2004 | Kaneko |
| 6,672,770 | B2 | 1/2004 | Miyazaki et al. |
| 6,702,472 | B2 | 3/2004 | Sera et al. |
| 6,715,926 | B2 | 4/2004 | Tajima et al. |
| 6,761,486 | B2 | 7/2004 | Miyazaki et al. |
| 6,796,714 | B2 * | 9/2004 | Ohkuma et al. ............ 384/585 |
| 6,879,149 | B2 | 4/2005 | Okada et al. |
| 7,695,195 | B2 | 4/2010 | Okasaka |
| 7,866,893 | B2 | 1/2011 | Ohtsuki |
| 7,874,734 | B2 | 1/2011 | Komori et al. |
| 7,883,272 | B2 | 2/2011 | Kiuchi et al. |
| 8,221,004 | B2 * | 7/2012 | Fujimura et al. ............ 384/544 |
| 2001/0019223 | A1 | 9/2001 | Kaneko |
| 2001/0046339 | A1 | 11/2001 | Miyazaki et al. |
| 2002/0051597 | A1 | 5/2002 | Sera et al. |
| 2002/0068639 | A1 | 6/2002 | Tajima et al. |
| 2002/0085781 | A1 * | 7/2002 | Ohkuma et al. ............ 384/544 |
| 2002/0110300 | A1 * | 8/2002 | Meeker et al. ............ 384/544 |
| 2002/0146185 | A1 | 10/2002 | Miyazaki et al. |
| 2003/0002761 | A1 | 1/2003 | Hagiwara |
| 2003/0081872 | A1 | 5/2003 | Sahashi et al. |
| 2003/0103705 | A1 | 6/2003 | Miyazaki et al. |
| 2004/0037482 | A1 | 2/2004 | Ouchi |
| 2004/0120622 | A1 | 6/2004 | Tajima et al. |
| 2004/0121847 | A1 * | 6/2004 | Fukushima et al. .......... 464/178 |
| 2005/0094912 | A1 | 5/2005 | Ouchi |
| 2005/0141798 | A1 | 6/2005 | Okasaka |
| 2006/0239600 | A1 | 10/2006 | Shigeoka et al. |
| 2006/0274986 | A1 | 12/2006 | Komori et al. |
| 2008/0089628 | A1 | 4/2008 | Kiuchi et al. |
| 2008/0247700 | A1 | 10/2008 | Komori et al. |
| 2008/0310784 | A1 | 12/2008 | Ohtsuki |
| 2009/0154856 | A1 * | 6/2009 | Kubota et al. ............... 384/510 |
| 2010/0278468 | A1 | 11/2010 | Fujimura et al. |

FOREIGN PATENT DOCUMENTS

| | | |
|---|---|---|
| EP | 1729021 A1 * | 12/2006 |
| GB | 2323823 A * | 10/1998 |
| JP | 63-184501 | 7/1988 |
| JP | 4-322837 | 11/1992 |
| JP | 04322837 A * | 11/1992 |
| JP | 7-118682 | 5/1995 |
| JP | 9-164803 | 6/1997 |
| JP | 09-220904 | 8/1997 |
| JP | 10-95203 | 4/1998 |
| JP | 10-196661 | 7/1998 |
| JP | 11-078408 | 3/1999 |
| JP | 11-129703 | 5/1999 |
| JP | 2001-1708 | 1/2001 |
| JP | 2001-1710 | 1/2001 |
| JP | 2001-018604 | 1/2001 |
| JP | 2001-171309 | 6/2001 |
| JP | 2001-180210 | 7/2001 |
| JP | 2001-233001 | 8/2001 |
| JP | 2002-139060 | 5/2002 |
| JP | 2002-178706 | 6/2002 |
| JP | 2002-192264 | 7/2002 |
| JP | 2002-250358 | 9/2002 |
| JP | 2002-254132 | 9/2002 |
| JP | 2002-283804 | 10/2002 |
| JP | 2002-295505 | 10/2002 |
| JP | 2002-339959 | 11/2002 |
| JP | 2002-372548 | 12/2002 |
| JP | 2003-042173 | 2/2003 |
| JP | 2003-074571 | 3/2003 |
| JP | 2003-90334 | 3/2003 |
| JP | 2003-097588 | 4/2003 |
| JP | 2003136160 A * | 5/2003 |
| JP | 2004019821 A * | 1/2004 |
| JP | 2004-132552 | 4/2004 |
| JP | 2004-256039 | 9/2004 |
| JP | 2005-036905 | 2/2005 |
| JP | 2005-048839 | 2/2005 |
| JP | 2005-106215 | 4/2005 |
| JP | 2005-138653 | 6/2005 |
| JP | 2005-188599 | 7/2005 |
| JP | 2005-233402 | 9/2005 |
| JP | 2006-052817 | 2/2006 |
| JP | 2006-105343 | 4/2006 |
| JP | 2006-112516 | 4/2006 |
| JP | 2006-118548 | 5/2006 |
| JP | 2006-161856 | 6/2006 |
| JP | 2006-161970 | 6/2006 |
| JP | 2006-206047 | 8/2006 |
| JP | 2006-316803 | 11/2006 |
| JP | 2006-336576 | 12/2006 |
| JP | 2006-336757 | 12/2006 |
| JP | 2006-336759 | 12/2006 |
| JP | 2006-336760 | 12/2006 |
| JP | 2006-336761 | 12/2006 |
| JP | 2007-107573 | 4/2007 |
| WO | 02/078979 A1 | 10/2002 |
| WO | WO 2006040897 A1 * | 4/2006 |
| WO | WO 2006059467 A1 * | 6/2006 |

OTHER PUBLICATIONS

International Preliminary Report on Patentability mailed on Jun. 19, 2008 and issued in corresponding International Patent Application No. PCT/JP2006/323557.

Chinese Office Action issued Aug. 29, 2009 in corresponding Chinese Patent Application 200680045600.3.

Chinese Office Action issued Aug. 4, 2010 in corresponding Chinese Patent Application 200680045600.3.

Partial English Translation of the First Chinese Office Action issued Aug. 29, 2009 in corresponding Chinese Patent Application 200680045600.3.

Partial English Translation of the Second Chinese Office Action issued Aug. 4, 2010 in corresponding Chinese Patent Application 200680045600.3.

Third Chinese Office Action issued Jan. 27, 2011 in corresponding Chinese Patent Application 200680045600.3.

Japanese Notification of Reason(s) for Rejection issued Aug. 9, 2011 in corresponding Japanese Patent Application 2005-350479.

Office Action issued in U.S. Appl. No. 12/086,000 mailed, Jun. 8, 2011.

Office Action issued in U.S. Appl. No. 12/086,000 mailed, Jun. 28, 2011.

Office Action issued in U.S. Appl. No. 12/086,000 mailed, Sep. 1, 2011.

Japanese Notification of Reason(s) for Rejection issued Dec. 27, 2011 in corresponding Japanese Patent Application No. 2006-004978.

Japanese Notification of Reason(s) for Rejection issued Dec. 27, 2011 in corresponding Japanese Patent Application No. 2006-010702.

Japanese Notification of Reason(s) for Rejection issued Dec. 27, 2011 in corresponding Japanese Patent Application No. 2006-021042.

U.S. Office Action mailed Dec. 30, 2011 issued in related U.S. Appl. No. 12/448,946.

Chinese Office Action dated Feb. 2, 2012 issued in related Chinese Patent Application No. 200880002237.6.

Office Action issued in U.S. Appl. No. 12/086,000 mailed, Feb. 29, 2012.

(56) References Cited

OTHER PUBLICATIONS

Japanese Notification of Reason(s) for Rejection mailed Mar. 27, 2012 issued in corresponding Japanese Patent Application No. 2007-008075.
Third Chinese Office Action mailed May 29, 2012 issued in related Chinese Patent Application No. 200880002237.6.
U.S. Notice of Allowance mailed Mar. 21, 2012 issued in related U.S. Appl. No. 12/448,946.
Japanese Office Action issued Sep. 4, 2012 in corresponding Japanese Patent Application No. 2006-004978.
Japanese Office Action issued Sep. 4, 2012 in corresponding Japanese Patent Application No. 2006-010702.
Japanese Office Action issued Sep. 4, 2012 in corresponding Japanese Patent Application No. 2006-021042.
Japanese Office Action issued Oct. 16, 2012 in related Japanese Patent Application No. 2007-008075.
European Office Action dated May 3, 2012 issued in related European Patent Application No. 08702765.2.
Chinese Office Action mailed Feb. 28, 2013 for corresponding Chinese Application No. 200880002237.6.

* cited by examiner

Fig. 16B
Fig. 16A
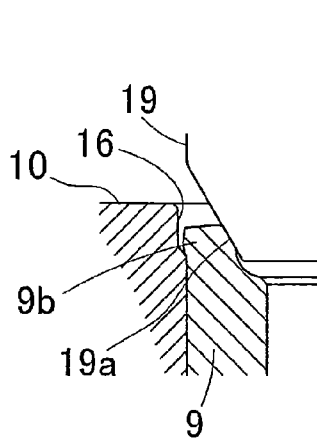
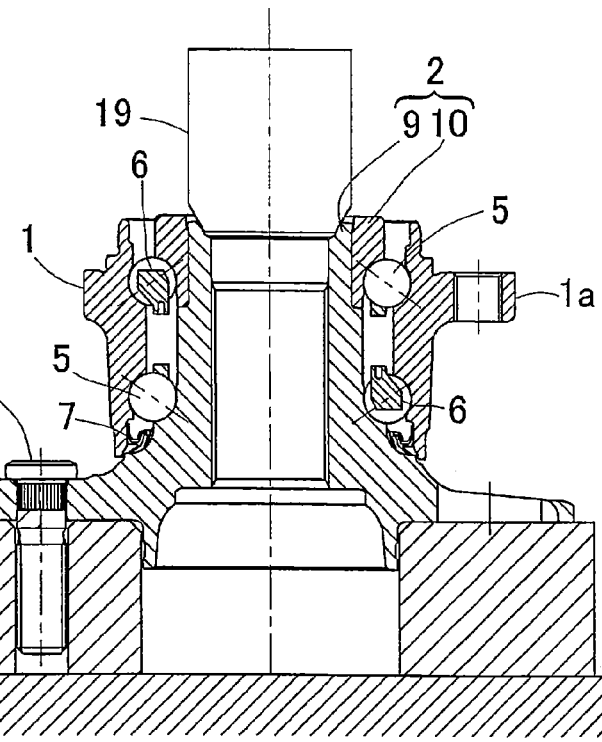
Fig. 17
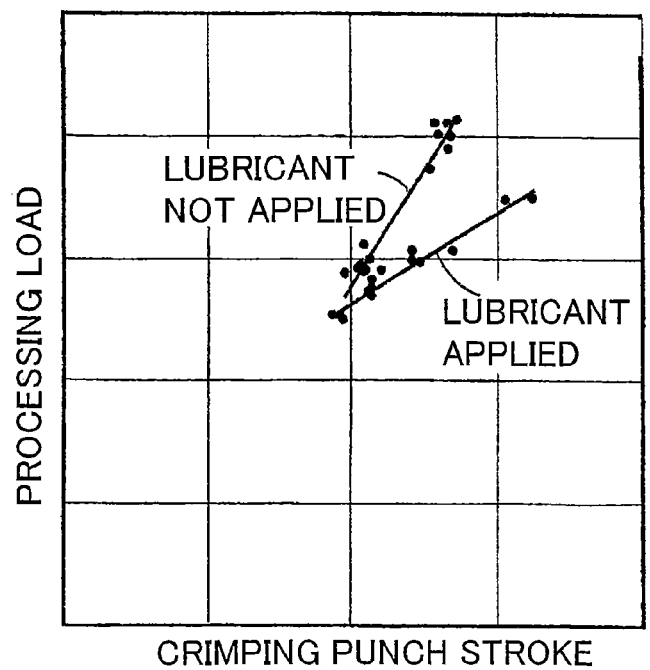

Fig. 18 - Prior Art
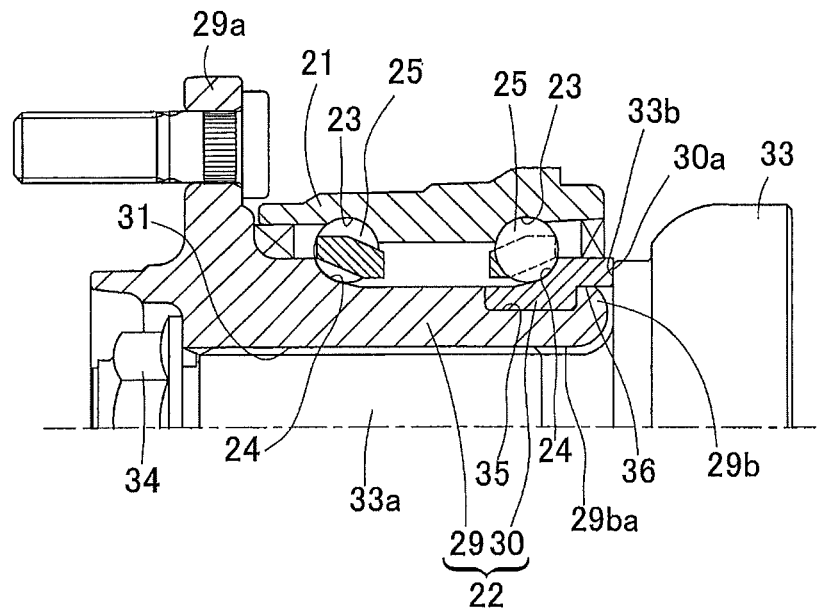
Fig. 19 - Prior Art
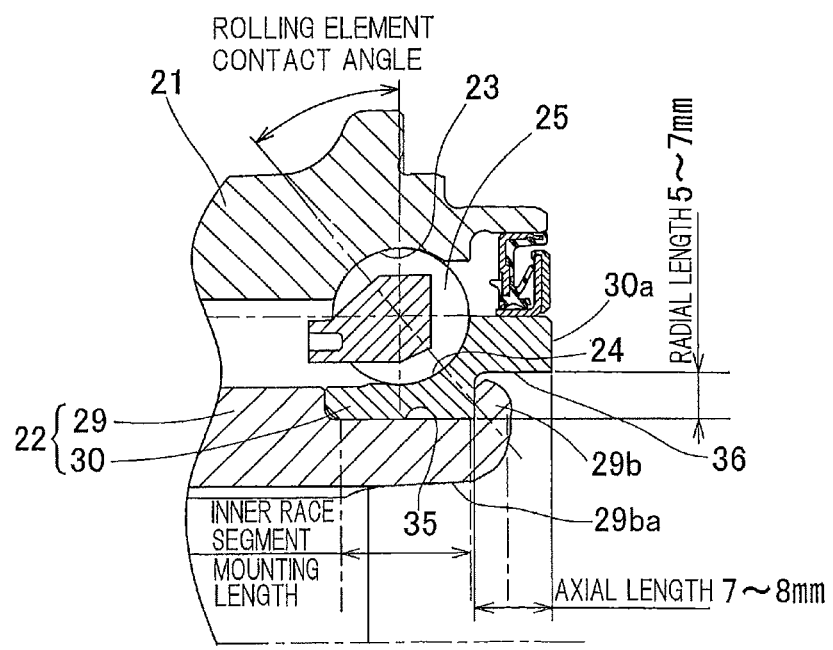

METHOD OF MANUFACTURING WHEEL SUPPORT BEARING ASSEMBLY

CROSS-REFERENCE TO RELATED APPLICATIONS

This application is a divisional of U.S. application Ser. No. 12/086,000, filed Jun. 8, 2008 now abandoned, which claims the benefit under 35 U.S.C. Section 371, of PCT International Application Number PCT/JP2006/323557, filed Nov. 27, 2006, and also the following Japanese Applications filed in the Japanese Patent Office: 2005-350479 filed on Dec. 5, 2005, 2006-004978 filed on Jan. 12, 2006, 2006-010702 filed on Jan. 19, 2006, and 2006-021042 filed on Jan. 30, 2006, the contents of which are incorporated herein by reference.

BACKGROUND

1. Field

The present invention relates to a wheel support bearing assembly for rotatably supporting a vehicle wheel such as used in, for example, an automotive vehicle and a method of manufacturing such wheel support bearing assembly.

2. Description of the Related Art

The wheel support bearing assembly for the support of a vehicle drive wheel of a structure shown in FIG. 18 has hitherto been suggested. See, for example, the Japanese Laid-open Patent Publication No. 09-164803. This known wheel support bearing assembly includes double rows of ball-shaped rolling elements 25 operatively interposed between raceway surfaces 23 defined in an outer member 21 and raceway surfaces 24 defined in an inner member 22, respectively. The inner member 22 referred to above is comprised of a hub axle 29, having an outer periphery formed with a radially outwardly extending hub flange 29a for the support of the vehicle wheel, and an inner race segment 30 mounted externally on a portion of the outer periphery of the hub axle 29 on an inboard side. The hub axle 29 has an axial bore 31 defined therein, into which a stem portion 33a of an outer race 33 of a constant velocity universal joint is inserted and then splined to the hub axle 29. With the step portion 33a splined to the hub axle 29 in this manner, an annular shoulder 33b of the constant velocity universal joint outer race 33 is urged against an inboard end face 30a of the inner race segment 30. When in this condition, a nut 34 is threadingly mounted on a free end of the stem portion 33a, the inner member 22 can be axially clamped between the constant velocity universal joint outer race 33 and the nut 34.

As shown in FIG. 19 showing a portion of FIG. 18 on an enlarged scale, in this suggested example, the inner race segment 30 is externally mounted on a radially inwardly depressed inner race mount 35, defined in an outer periphery of an inboard end portion of the hub axle 29. An inboard inner peripheral edge portion of the inner race segment 30, that is delimited between an annular inboard end face thereof and an inner peripheral surface thereof, is depleted axially inwardly of the inner race segment 30 to define a stepped area 36, so that when the inboard end portion of the hub axle 29 is deformed by a orbital forging to have a radially outwardly expanded diameter, the plastically deformed portion 29b can be crimped in position within the stepped area 36 in the inner race segment 30. By so doing, any possible detachment of the inner race segment 30 by the effect of an external force occurring during assemblage thereof into an automotive vehicle can be avoided.

It has however been found that the wheel support bearing assembly disclosed in the above mentioned patent document has the following problems:

(1) Since the plastically deformed portion 29b in the hub axle 29 is large in size, the stepped area 36 formed in the inboard end portion of the inner race segment 30 must have a large radial step (of a size having a radial difference of, for example, about 5 to 7 mm). If the size of the stepped area 36 is so large as described above, the surface area of the inboard end face 30a of the inner race segment 30 decreases correspondingly, resulting in an increase of the contact pressure between it and the shoulder 33b of the constant velocity universal joint outer race 33. For this reason, the known wheel support bearing assembly of the structure discussed above, when used in an actual automotive vehicle, tend to involve a cause of frictional wear and/or abnormal noises.

(2) If an attempt is made to accommodate the plastically deformed portion 29b in the hub axle 29 at a location axially inwardly of the inboard end of the inner race segment 30, the stepped area 36 in the inner race segment 30 must have an increased axial length (for example, about 7 to 8 mm). The use of the stepped area 36 in the inner race segment of the increased axial length may result in a tendency of the inner race stepped area 36 to assume a position on a linear line defining the angle of contact of the rolling elements and, therefore, there is the possibility that the lifetime will be reduced as a result of a considerable deformation of the inner race segment under the influence of a load imposed during the operation. The use of the inner race stepped area 36 of the increased axial length may also result in a reduction of the length (surface area), over which the inner race segment 30 is engaged on the hub axle 29, by a quantity corresponding to that reduced and, accordingly, the lifetime of the wheel support bearing assembly may be reduced as a result of occurrence of a creepage in the inner race segment. Although those problems can be resolved if the axial length of the inner race segment is increased, the increase of the axial length of the inner race segment may result in a requirement to increase an extra space in the axial direction.

(3) In addition, since the plastically deformed portion 29b in the hub axle 29 is large in size, a crimping punch may interfere with the inner race segment 30 during the orbital forging to such an extent as to result in a difficulty in processing.

SUMMARY

In view of the foregoing, the present invention is intended to provide a wheel support bearing assembly, which is effective to avoid a possible detachment of the inner race segment during assemblage onto an automotive vehicle without the bearing functionality being affected adversely, and, also, to provide a method of manufacturing such wheel support bearing assembly.

In order to accomplish the foregoing object, the present invention provides a wheel support bearing assembly for rotatably supporting a vehicle drive wheel, which includes an outer member having an inner periphery formed with a double row of raceway surfaces, an inner member having raceway surfaces formed therein and opposite to those raceway surfaces in the outer member, and a double row of rolling elements each row operatively interposed between the respective raceway surfaces in the outer and inner members. The inner member referred to above is made up of a hub axle, having a wheel mounting hub flange formed in an outer periphery thereof and also having a center bore, and an inner race segment mounted on an outer periphery of an inboard end portion of the hub axle, with the raceway surfaces being defined respectively in the hub axle and the inner race segment.

In this wheel support bearing assembly, the inner race segment has an inner peripheral surface provided with an annular stepped area that extends to an inboard end face of the inner race segment and has a small depth defined at an inner peripheral edge of the inboard end face of the inner race segment. This annular stepped area is of a shape made up of a straight area portion in the form of a cylindrical surface and an inclined surface portion continued from an outboard end of the straight area portion to the inner peripheral surface of the inner race segment, and a plastically deformed portion engageable with the inclined surface portion of the annular stepped area in the inner race segment as a result of crimping of the hub axle is provided in the hub axle.

The wheel support bearing assembly of the present invention is of a structure, in which the plastically deformed portion of the hub axle is engaged with the inclined surface portion of the annular stepped area in the inner race segment to thereby avoid detachment of the inner race segment. In this structure, since the stepped area of the inner race segment extends a very limited range to the inner peripheral edge of the inner race segment, it is possible to minimize the size of the annular stepped area while securing a bearing strength against a possible detachment of the inner race segment. For this reason, any possible reduction in surface area of the inner race segment end face can be minimized even though the annular stepped area is employed, an undesirable increase of the contact pressure between it and an end face of the constant velocity universal joint outer race can be suppressed and generation of frictional wear and/or abnormal noises, which would result from occurrence of creepage in the inner race segment, can be avoided. Accordingly, even though the annular stepped area in the inner race segment inner peripheral surface is reduced in size as hereinabove described, a sufficient bearing strength against a possible detachment of the inner race segment, which would otherwise occur during assemblage of the bearing assembly onto an automotive vehicle, can be obtained. As discussed above, if the inner race segment stepped area is reduced in size as much as possible to such an extent that the bearing strength against the possible inner race segment detachment will not be affected adversely, it is possible to avoid the possible inner race segment detachment during the assemblage onto the automotive vehicle without the bearing functionality being affected adversely. In other words, the problem associated with the inner race segment detachment tends to occur during the assemblage onto the automotive vehicle and, since at the time of completion of the assemblage it is firmly connected in position between the outer race of the constant velocity universal joint and a fastening element, the required bearing strength against the possible inner race segment detachment can be secured even with such a small annular stepped area as described above.

In a preferred embodiment of the wheel support bearing assembly of the present invention, the plastically deformed portion referred to above is formed by urging a crimping punch having a front end portion, the outer peripheral surface of which is tapered, into an inner periphery of the inboard end portion of the hub axle to allow it to have an expanded diameter.

Since the crimping process to be performed on the inboard end portion of the hub axle is performed by the crimping punch having the front end portion of which outer peripheral surface is tapered, which is pressed into the inner periphery of the inboard end portion of the hub axle, the process can be easily and readily performed without the crimping punch interfering with the inner race segment during the crimping and pressing. Through the crimping process, the plastically deformed portion of the hub axle can be easily plastically deformed along the inclined surface portion of the inner race segment stepped area. Because of this, the crimping process can be properly performed and securement of the bearing strength can be further assured.

The inclined surface portion referred to above is preferably a tapered surface and the plastically deformed portion will neither project outwardly from the end face of the inner race segment, nor contact the straight area portion of the annular stepped area.

Where the inclined face in the annular stepped area in the inner race segment is chosen to be a tapered surface inclined relative to the axial direction, the plastically deformed portion in the hub axle undergoes a plastic deformation so as to contact tightly with no gap formed and, therefore, an excellent reliability can be obtained in engagement with the annular stepped area. Accordingly, the crimping of the plastically deformed portion can be accomplished easily.

Also, since the plastically deformed portion does not contact the straight area portion in the inner race segment stepped area when the plastically deformed portion in the hub axle is crimped and pressed, no excessive load will act on portions of the inner race segment and portions of the hub axle other than the plastically deformed portion and it is possible to minimize a deformation of a portion of the hub axle, with which the stem portion of the constant velocity universal joint is engaged, and expansion of the inner race segment. Accordingly, it is possible to avoid the bearing functionality from being affected adversely.

Preferably, the plastically deformed portion referred to above does not protrude outwardly beyond the end face of the inner race segment and the crimping punch is of a design in which a corner between the tapered surface and the front end face is chamfered.

Since the crimping process applied to the inboard end portion of the hub axle is carried out by pressing the crimping punch, in which the outer peripheral surface thereof is tapered and the corner between this tapered surface and the front end face is chamfered, into the inner peripheral surface of the inboard end portion of the hub axle, it is possible to accomplish a diameter expansion and crimping process to a required degree of processing without allowing the crimping punch to interfere with the hub axle during the crimping and pressing.

In another preferred embodiment of the wheel support bearing assembly of the present invention, the plastically deformed portion does not protrude outwardly beyond the end face of the inner race segment, a hub axle mounting surface, which is an inner diametric surface portion of the inner race segment that is continued from the annular stepped area, is rendered to be a ground surface, and a transit portion between the hub axle mounting surface and the inclined surface portion of the annular stepped area is rendered to have a sharp corner shape.

According to this preferred embodiment, since the hub axle mounting surface, which is an inner diametric surface portion of the inner race segment that is continued from the annular stepped area, is rendered to be a ground surface and the transit portion between the hub axle mounting surface and the inclined surface portion of the annular stepped area is rendered to have a sharp corner shape, contact of the plastically deformed portion to the annular stepped area can be enhanced. Because of this, it is possible to minimize the amount of movement of the inner race segment relative to the hub axle, which may take place when an external force acts during the assemblage.

As discussed above, in the wheel support bearing assembly of the present invention, it is possible to avoid the inner race segment detachment during the assemblage onto the automotive vehicle without the bearing functionality being affected adversely, and, also, the amount of movement of the inner race segment during the assemblage can be minimized. Accordingly, while if the inner race segment moves during the assemblage, a process to return the inner race segment is required, resulting in complication of assemblage onto the automotive vehicle, this can be avoided advantageously.

In a further preferred embodiment of the present invention, a lubricant is applied to a surface of the plastically deformed portion which contacts the crimping punch. For the lubricant referred to above, a lubricating oil mixed with, for example, molybdenum can be suitably employed.

According to this preferred embodiment, since the surface of the plastically deformed portion, which contacts the crimping punch, is applied with a lubricant, no clinging will occur during the crimping process, the quality of appearance and the lifetime of the crimping punch can be increased, the load of the crimping process can be reduced, and the crimping equipment can have a reduced size. That is to say, if no lubricant is applied in the manner described above, problems have been encountered with in that clinging will occur during the crimping process to such an extent as to result in a reduction of the quality of appearance, the lifetime of the crimping punch tends to be short and the crimping equipment must have a large size to a certain extent in order to secure a required pressing force with which the crimping punch is pressed, but those problems can be resolved advantageously.

The present invention also provides a method of manufacturing the wheel support bearing assembly, which is applicable to the wheel support bearing assembly of the structure discussed above and in which the plastically deformed portion, which assumes a cylindrical shape before it is so deformed, is crimped to a diameter expanded condition by pressing a crimping punch, of which front end portion outer peripheral surface is rendered to be a tapered surface, axially into a inner peripheral surface of the inboard end portion of the hub axle.

According to the above described method of the present invention, since the crimping process is carried out by pressing the crimping punch, of which front end portion outer peripheral surface is rendered to be a tapered surface, axially into the inner peripheral surface of the inboard end portion of the hub axle, the crimping punch will not interfere with the inner race segment during the crimping and pressing and this crimping process can be facilitated.

In a preferred embodiment of the method of manufacturing the wheel support bearing assembly according to the present invention, by adjusting an axial stroke over which the crimping punch is pressed, the outer diameter of the plastically deformed portion after the crimping can be adjusted.

According to the above described method of manufacturing the wheel support bearing assembly, the stroke, over which the crimping punch is pressed, can be adjusted in dependence on a factor of variation on machining accuracy brought about by a to-be-machined article, and/or a condition of the crimping punch. Because of this, a press work can be accomplished stably at all time so that the radial expansion of the plastically deformed portion and the height of the projection can be constant, ensuring a prevention of the inner race segment detachment of a completed product. In other words, while where the pressing is carried out under a pressing load predetermined in consideration of the shaft diameter of the hub axle, the wall thickness and the axial length of the inboard end portion of the hub axle and the shape of the inner race segment stepped area, problems have been encountered with in association of the hardness of a matrix, the range of heat treatment, a factor of variation in machining accuracy brought about by the to-be-machined article such as, for example, the dimensions of the plastically deformed portion, the condition of the crimping punch (such as, for example, deterioration of the surface, the condition of deposited oil and others) cannot be accommodated, but those problems can be resolved advantageously.

In another preferred embodiment of the method of manufacturing the wheel support bearing assembly in accordance with the present invention, before the crimping being performed with the crimping punch, a lubricant oil is applied to one or both of an inner peripheral surface of the cylindrical plastically deformed portion of the hub axle and the front end portion outer periphery of the crimping punch, and the crimping is carried out in this applied condition. For the lubricant oil referred to above, a lubricating oil mixed with, for example, molybdenum can be suitably employed.

According to the above described method of manufacturing the wheel support bearing assembly, since before the crimping is carried out with the crimping punch the lubricant oil is applied to one or both of an inner peripheral surface of the cylindrical portion of the hub axle and the outer periphery of the free end portion of the crimping punch, and the crimping is then carried out in this applied condition, clinging or seizure of the crimping punch to that portion of the hub axle, where the crimping punch contacts, can be prevented even though it is a simple crimping method, in which the crimping punch is pressed, and, accordingly, not only can the quality of appearance of the product be increased, but also the lifetime of the crimping punch can be increased. Also, application of the lubricant oil makes it possible to reduce the load during the machining as compared with the product not applied with the lubricant oil, that is, product having the same degree of crimping, that is, the same machining stroke, and, for this reason, not only can the crimping process be accomplished easily, but the crimping equipment can have a reduced size. Accordingly, with an additional advantage that the crimping equipment suffices, in which the crimping punch is merely pressed, investment in plant and equipment can be minimized.

In a further preferred embodiment of the method of manufacturing the wheel support bearing assembly in accordance with the present invention, the crimping punch is of a design in which a corner between the tapered surface and the front end face is chamfered.

According to the above described method of manufacturing the wheel support bearing assembly, since crimping is carried out to attain a diameter expanded condition by axially pressing the crimping punch, in which the corner between the tapered surface and the front end face is chamfered, axially into the inner peripheral surface of the inboard end portion of the hub axle, interference between the crimping punch and the hub axle can be avoided and the diameter expansion and the crimping process can easily and accurately be carried to a required decree of processing. Also, a press work can be accomplished stably at all time so that the radial expansion of the plastically deformed portion and the height of the projection can be constant, ensuring a prevention of the inner race segment detachment of a completed product.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 16A is an explanatory diagram of the wheel support bearing assembly according to the third preferred embodiment of the present invention, showing the condition in which the hub axle crimping process is being performed;

FIG. 16B is an diagram showing, on an enlarged scale, a portion of the wheel support bearing assembly, where the crimping punch is brought into contact with the hub axle in the drawing of FIG. 16A;

FIG. 17 is a chart showing results of experiments conducted to determine the relation between the stroke of the crimping punch and the crimping load for the purpose of comparing the wheel support bearing assembly according to the third preferred embodiment of the present invention, in which a lubricant oil is applied, with the wheel support bearing assembly, in which a lubricant oil is not applied;

FIG. 18 is a longitudinal sectional view of the prior art wheel support bearing assembly;

FIG. 19 is a fragmentary longitudinal sectional view, on an enlarged scale, of the prior art wheel support bearing assembly shown in FIG. 18;

DETAILED DESCRIPTION OF THE PREFERRED EMBODIMENTS

Figure 1:
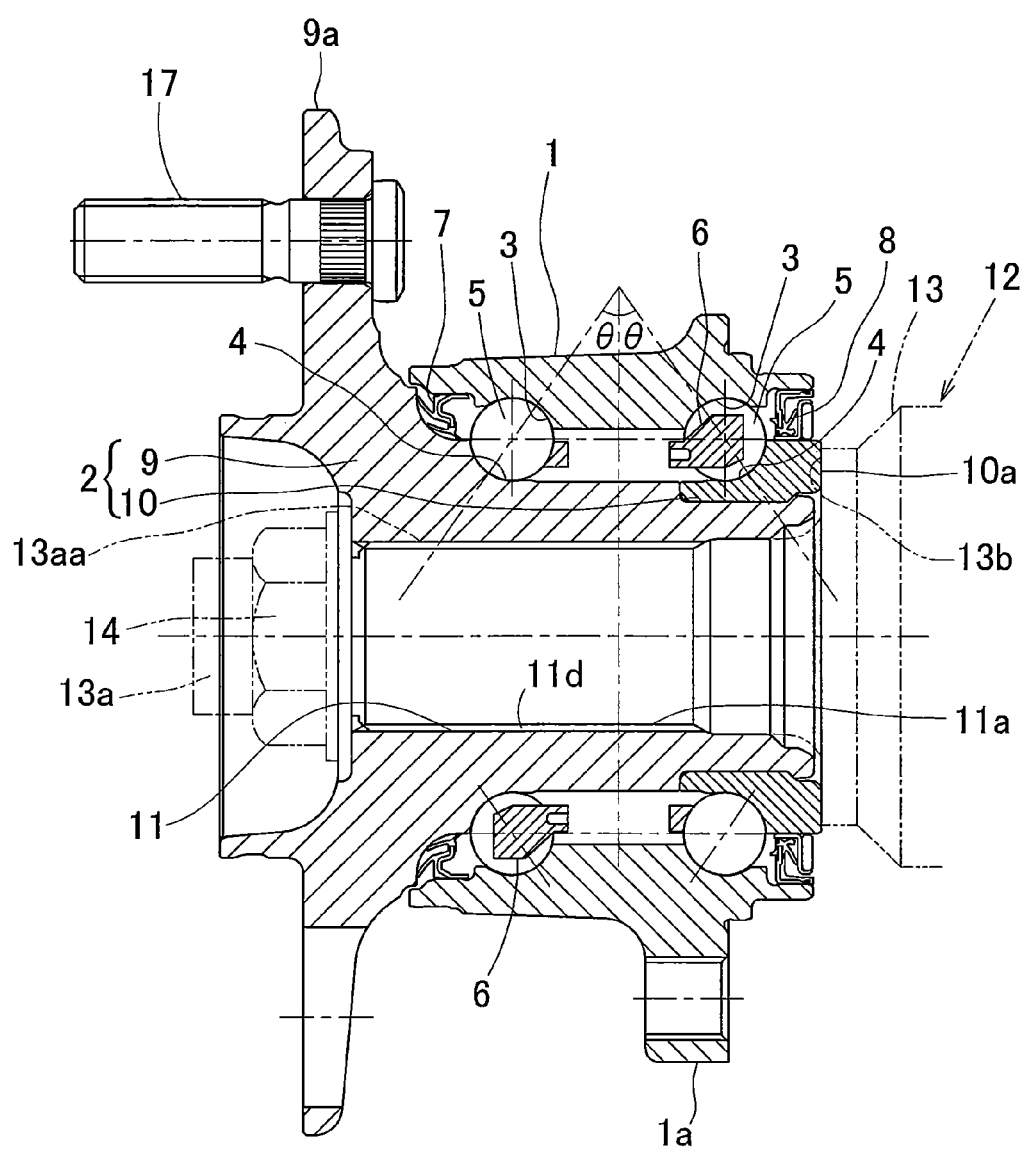
FIG. 1 is a longitudinal sectional view showing a wheel support bearing assembly according to first and second preferred embodiments of the present invention.

A first preferred embodiment of the present invention will be described in detail with particular reference to FIGS. 1 to 3. This embodiment is applied to a wheel support bearing assembly for rotatably supporting a vehicle drive wheel, which is an inner race segment rotating model of a third generation type. It is to be noted that in the specification herein presented, the term "outboard" is intended to mean one side of an automotive vehicle body away from the longitudinal center of the automotive vehicle body, whereas the term "inboard" is intended to mean the opposite side of the automotive vehicle body close towards the longitudinal center of the automotive vehicle body.

The illustrated wheel support bearing assembly includes an outer member 1 having an inner periphery formed with a double row of raceway surfaces 3, an inner member 2 having raceway surfaces 4 formed therein and opposite to those raceway surfaces 3, and a double row of ball-shaped rolling elements 5 interposed between the raceway surfaces 3 in the outer member 1 and the raceway surfaces 4 in the inner member 2. The wheel support bearing assembly is rendered to be of a double row, outwardly oriented angular contact ball bearing type, and the rolling elements 5 are retained by respective retainers 6 one employed for each of the rows of the rolling elements 5. The raceway surfaces 3 and 4 referred to above have an arcuate shape in cross-section and are so formed as to represent respective rolling element contact angles θ that are held in back-to-back relation with each other. Opposite open ends of an annular bearing space delimited between the outer member 1 and the inner member 2 are sealed by respective sealing members 7 and 8.

The outer member 1 serves as a stationary or fixed member and is of one-piece construction having a radially outwardly extending coupling flange 1a that is secured to a knuckle forming a part of an automobile suspension system (not shown) mounted on an automotive body structure.

On the other hand, the inner member 2 serves as a rotatable member and is made up of a hub axle 9 having an outer periphery formed with a wheel mounting hub flange 9a, and an inner race segment 10 fixedly mounted on an outer periphery of an inboard end portion of the hub axle 9. The raceway surfaces 4 one for each row are formed in the hub axle 9 and the inner race segment 10, respectively. The hub axle 9 has an axially extending center bore 11 defined therein and the raceway surfaces 4 in the hub axle 9 may be a surface hardened by means of a surface hardening treatment, particularly an induction hardening treatment. The inner race segment 10 is hardened in its entirety from surface to core thereof by means of a hardening treatment.

Figure 2:
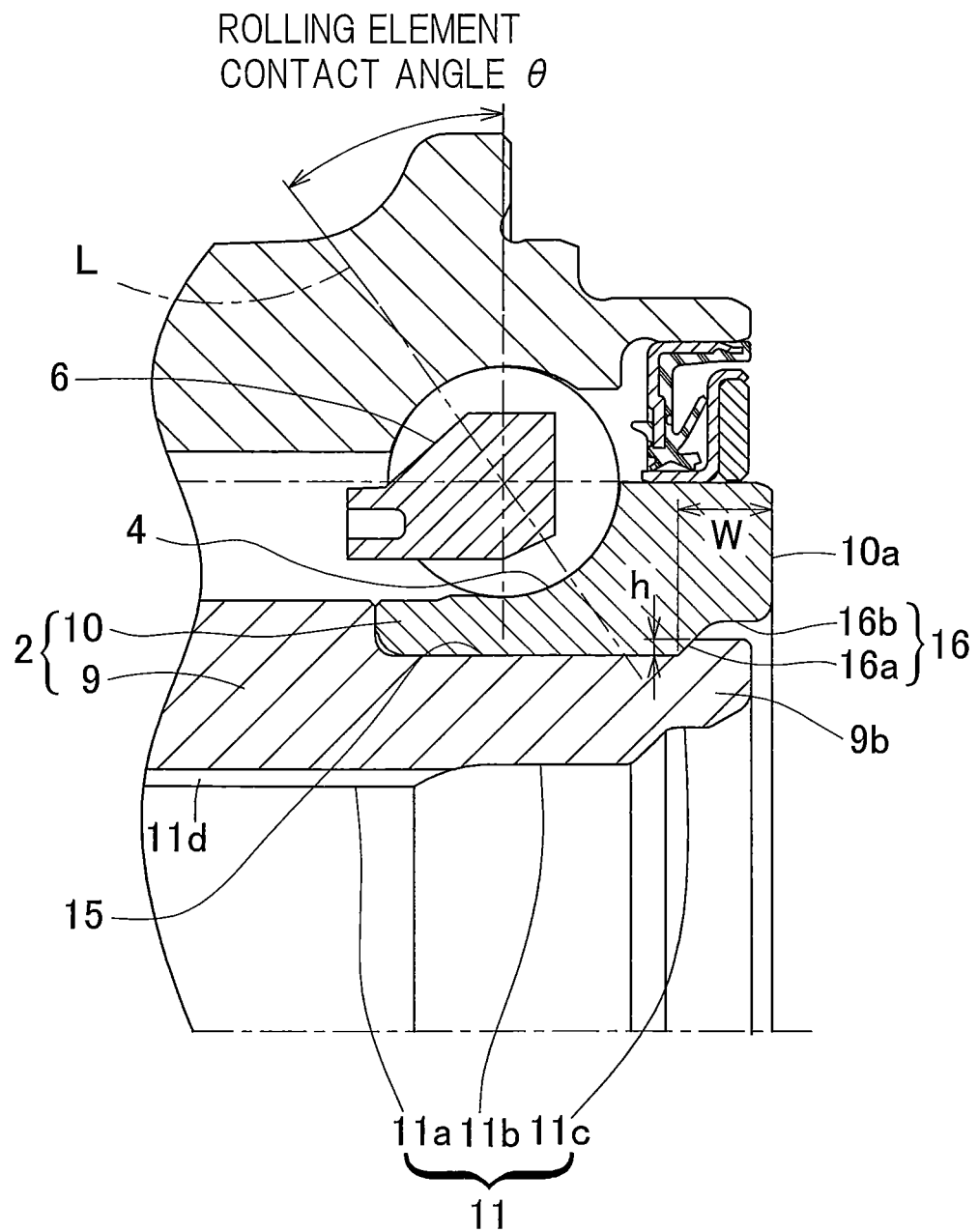
FIG. 2 is a fragmentary longitudinal view, on an enlarged scale, showing a portion of the wheel support bearing assembly shown in FIG. 1.

As shown on an enlarged scale in FIG. 2, the center bore 11 of the hub axle 9 is of a double stepped configuration including a general diametric portion 11a occupying an area from an outboard end face thereof to a location in proximity to the inboard end portion thereof, a radially outwardly stepped intermediate diametric portion 11b located on the inboard side of the general diametric portion 11a and having a diameter greater than that of the general diametric portion 11a, and a radially outwardly stepped large diametric portion 11c located on the inboard side of the stepped intermediate diametric portion 11b and having a diameter greater than that of the stepped intermediate diametric portion 11b. Referring again to FIG. 1, the general diametric portion 11a has an inner peripheral surface formed with a series of splined grooves 11d engageable with respective splined projections formed in an outer periphery of a stem portion 13a of a constant velocity universal joint 12.

Referring to FIG. 2 and as shown therein on an enlarged scale, an inner race mounting area 15 of a stepped configuration and of a diameter smaller than that of the outer peripheral surface of the remaining portion of the hub axle 9 is formed in the outer peripheral surface of the inboard end portion of the hub axle 9, and the inner race segment 10 is nested or mounted on this inner race mounting area 15.

The inner race segment 10 has an inner peripheral surface formed with a stepped area 16 which continues to an inboard annular face 10a of the inner race segment 10 and has a small depth defined at an inner peripheral edge of that inboard annular face 10a. An inner surface of the stepped area 16 includes an inclined surface portion 16a, which is continued on the outboard side thereof to the inner peripheral surface of the inner race segment 10 and has a diameter gradually increasing towards the inboard side and to the above described depth, that is, an inclined surface portion 16a having a section taken along an axial direction of the bearing assembly, which represents a straight or curved line, and a straight area portion 16b in the form of a cylindrical surface of the above described depth and continued from the inclined surface portion 16a to the inboard end face of the inner race segment 10. The inclined surface portion 16a is defined by a tapered surface, a curved surface, or a combination of a tapered surface and a curved surface continued therefrom such as shown and is preferably in the form of a tapered surface. It is to be noted that as a developed example, this inclined surface portion 16a is a surface perpendicular to the axial direction. The stepped area 16 is located on the inboard side of a straight line L forming the rolling element contact angle θ of the raceway surface 4 in the inner race segment 10. In other words, an axial range W of this stepped area 16 is so chosen as to be a range which does not intersect with an extension of the straight line L defining the rolling element contact angle θ of the inner race segment raceway surface 4.

On the other hand, an inboard end portion of the hub axle 9 will form a plastically deformed portion 9b when plastically deformed by means of a crimping process to have an expanded diameter. More specifically, as will be described in detail later with reference to FIG. 6, using a crimping punch 19 (FIG. 6) having a free end portion outer peripheral surface representing a tapered surface 19a and also having a corner between the tapered surface 19a and a free end face 19b, which is chamfered to define a chamfer (R2), the plastically deformed portion 9b is crimped in a diameter expanded condition by pressing this crimping punch 19 into an inner peripheral surface of the inboard end portion of the hub axle 9. This plastically deformed portion 9b is rendered to be a non-heat treated portion so that the crimping process can be facilitated. The plastically deformed portion 9b has an inner peripheral surface representing the radially outwardly stepped large diametric portion 11c of the center bore 11.

Figure 3A:
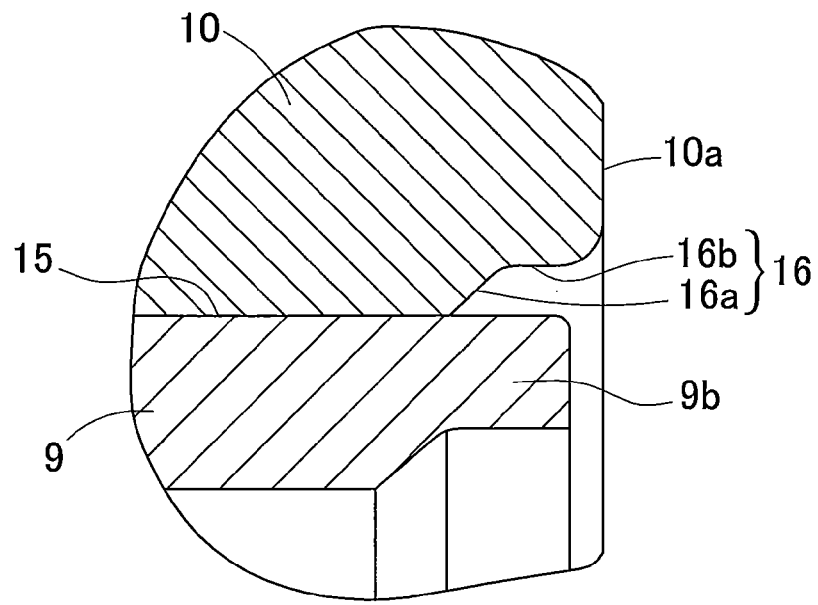
FIG. 3A is a fragmentary sectional view, on an enlarged scale, showing a plastically deformed portion in a hub axle, an inner race segment stepped area and its vicinity before a crimping process is performed.
Figure 3B:
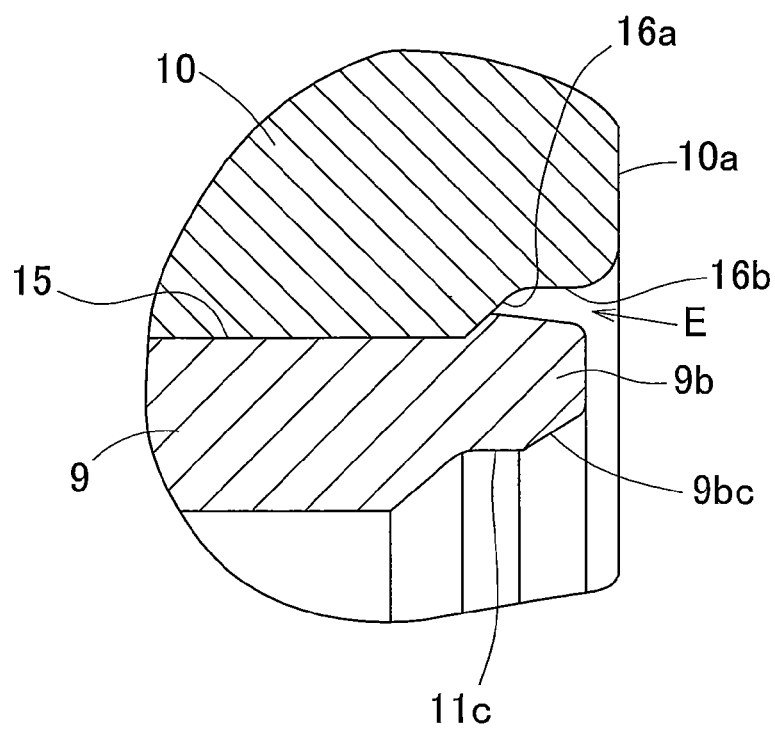
FIG. 3B is a fragmentary sectional view, on an enlarged scale, showing the plastically deformed portion in the hub axle, the inner race segment stepped area and its vicinity after the crimping process has been performed.

As best shown in FIG. 3A, the plastically deformed portion 9b represents a cylindrical shape before the crimping process is carried out, but is deformed to have an expanded diameter after the crimping process has been carried out as shown in FIG. 3B. The plastically deformed portion 9b, which has been deformed to have an expanded diameter, is brought into engagement with the inclined surface portion 16a of the stepped area 16 to thereby avoid a movement of the inner race segment 10 towards the inboard side. Also, the plastically deformed portion 9b after the crimping process has been carried out does not contact the straight area portion 16b of the stepped area 16, leaving a gap E between the plastically deformed portion 9b and the stepped area 16, and does not protrude outwardly from the annular face 10a of the inner race segment 10 towards the inboard side. It is to be noted that the plastically deformed portion 9b after the crimping process has been carried out has an inner diametric surface (hub crimping surface) 9bc representing a tapered surface with the inboard side opening.

Assemblage of this wheel support bearing assembly onto the automotive vehicle is carried out by inserting the stem portion 13a of the outer race 13 of the constant velocity universal joint 12, which forms one of coupling members or joint members, into the center bore 11 of the hub axle 9, then engaging the splined projections 13aa in the outer periphery of the stem portion 13a in the associated splined grooves 11d in the inner peripheral surface of the center bore 11, and finally fastening a nut 14 to a free end of the stem portion 13a to thereby connect the outer race 13 of the constant velocity universal joint 12 with the inner member 2. At this time, a annular shoulder 13b provided in the outer race 13 of the constant velocity universal joint 12 so as to be oriented towards the outboard side is urged against the annular face 10a of the inner race segment 10 that is oriented towards the inboard side, with the inner member 2 clamped axially between the outer race 13 of the constant velocity universal joint 12 and the fastening nut 14. The wheel mounting flange 9a is positioned on the outboard end portion of the hub axle 9, and a vehicle wheel (not shown) is fitted to the hub flange 9a by means of a plurality hub bolts 17 with a brake rotor (also not shown) intervening between it and the hub flange 9a.

According to the wheel support bearing assembly of the structure described hereinabove, since the stepped area 16 is provided in the inner peripheral surface of the inner race segment 10 and the plastically deformed portion 9b resulting from the crimping of the hub axle 9 is engaged with the stepped area 16, any possible detachment of the inner race segment 10 from the hub axle 9, which would be brought about by an external force generated during the assemblage onto the automotive vehicle, can be avoided.

Since the stepped area 16 is defined in a very limited range, say, the inner peripheral edge of the inner race segment 10, it is possible to minimize the size of the stepped area 16 while securing a bearing strength against the detachment of the inner race segment 10. Because of this, a reduction in surface area of the annular face 10a of the inner race segment 10 can be minimized notwithstanding the provision of the wall thinning stepped area 16, an increase of the pressure of contact with the annular shoulder 13b of outer race 13 of the constant velocity universal joint 12 can be suppressed, and generation of frictional wear and/or abnormal noises, which would result from generation of an inner race segment creepage, can be avoided. Accordingly, reduction in lifetime of the bearing assembly can be suppressed.

In particular, since the crimping process to form the plastically deformed portion 9b is carried out by using, as a crimping punch 19, what has a outer peripheral surface representing a tapered surface and also has a chamfered corner between the tapered surface and the free end face thereof and then pressing it into the inner peripheral surface of the inboard end portion of the hub axle 9, a diameter expanding crimping can be accomplished to a required degree of processing without the crimping punch 19 interfering with the hub axle 9 during the crimping process as will be discussed in detail later.

Also, since the center bore 11 of the hub axle 9 is rendered to be of a double stepped configuration, in which a portion thereof on the inboard side of the generally diametric portion 11a, where the splined grooves 11d are formed, includes the stepped large diametric portion 11c on the inboard side and the stepped intermediate diametric portion 11b having a diameter smaller than that of the stepped large diametric portion 11c, but greater than that of the general diametric portion 11a, the stepped intermediate diametric portion 11b can serves a guide for the insertion of the stem portion 13a of the constant velocity universal joint outer race 13, resulting in increase of the assemblability.

Also, since the wheel support bearing assembly of the type described above is a double row angular contact ball bearing with back-to-back arrangement and the axial range W of the stepped area 16 is so chosen as to be a range which does not intersect with an extension of the straight line L defining the rolling element contact angle θ, deformation of the inner race segment 10, which would otherwise occur as a result of an imposed load during the operation, can be minimized and, correspondingly, increase in lifetime is possible. In addition, since the axial length of the stepped area 16 in the inner race segment 10 is small, a mounting length for the inner race segment 10 relative to the hub axle 9 can be secured and, accordingly, a mounting surface area can be secured, resulting in suppression of generation of creepage in the inner race segment 10. Even in view of this, increase in lifetime is possible. Yet, there is no need to increase the overall axial length of the inner race segment 10 in order to secure, for example, the mounting length and, therefore, no extra space is needed in the axial direction.

When the plastically deformed portion 9b is formed in the hub axle 9 by means of the crimping process, this plastically deformed portion 9b does not contact the inner diametric straight area portion 16b in the inner race segment stepped area 16 and, therefore, no excessive load acts on various portions of the hub axle 9 except for the plastically deformed portion 9b and, also, various portions of the inner race segment 10, thereby minimizing deformation of the center bore 11 in the hub axle 9, in which the stem portion 13a of the constant velocity universal joint 13 is engaged, and expansion of the inner race segment 10. In this way, it is possible to avoid the bearing functionality being adversely affected. At the time of the crimping process being performed, it is possible to facilitate plastic deformation of the plastically deformed portion 9b of the hub axle 9 along the inclined surface portion 16a of the inner race segment stepped area 16. For this reason, a proper crimping can be accomplished to further ensure an acquisition of the bearing strength against the detachment of the inner race segment 10.

Since the plastically deformed portion 9b having an inner peripheral surface defined by the stepped large diametric portion 11c in the center bore 11 is a thin walled portion of the hub axle 9, where the wall thickness is small, but the inner diameter is large with the entire volume being small, the crimping can easily be accomplished. Also, since the plastically deformed portion 9b is small in volume, the height of projection h thereof will not increase more than necessary and, even though a step of the inner race segment stepped area 16 is made small, it makes it possible to avoid contact of the plastically deformed portion 9b with the straight area portion 16b of the inner race segment stepped area 16. In addition, since the center bore 11 is rendered to be of the double stepped configuration as hereinbefore described, the stem portion 13a of the constant velocity universal joint 12 can, when splined to the general diametric portion 11a in the center bore 11, be readily inserted into the center bore 11, thus facilitating the assemblage.

Also, in this wheel support bearing assembly, since the raceway surface 4 in the hub axle 9 is surface treated or hardened, lifetime of the rotatable member can be secured. Since the plastically deformed portion 9b is rendered to be a non-heat treated portion, the crimping can be accomplished easily. In view of the fact that the inner race segment 10 is a small component part having the raceway surface 4 defined therein and has its inner diametric surface engaged in the hub axle 9, the entirety of the inner race segment 10 from surface to core can be hardened as hereinbefore described, resulting in excellent lifetime of the rotatable member and excellent resistance to friction of the mounting surface. Yet, since the inner race segment 10 engages the surface of the inner race mounting area 15 of the hub axle 9, it is possible to render the resistance to friction to be excellent when the substantially entirety, except for a portion in proximity of the plastically deformed portion, is hardened by means of an induction heating technique. Since the plastically deformed portion 9b of the hub axle 9 is rendered to be a non-hardened portion, the crimping can easily be accomplished.

Figure 4:
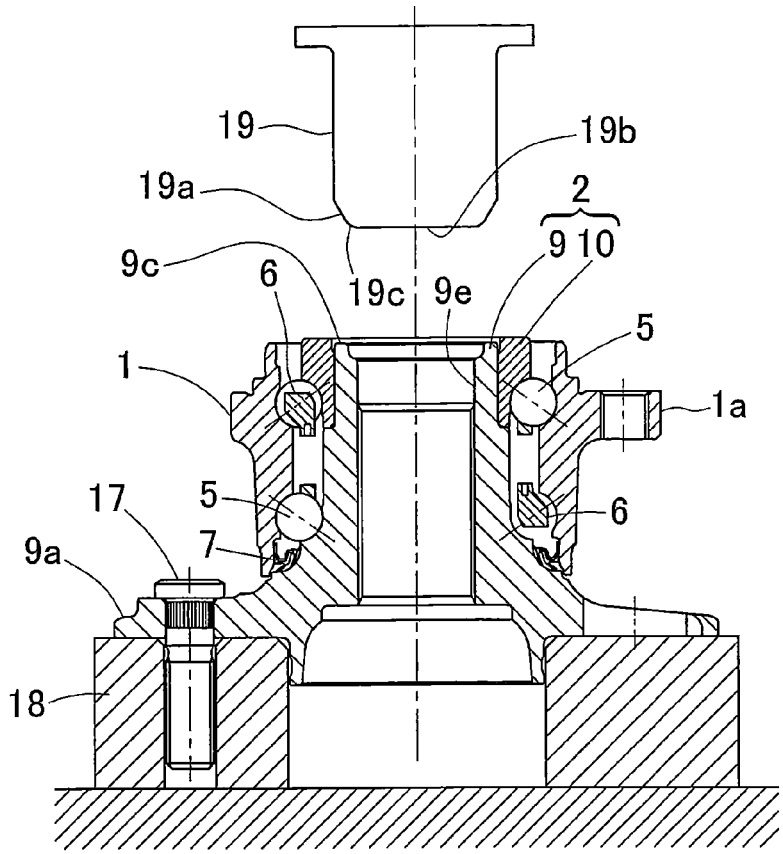
FIG. 4 is an explanatory diagram of the wheel support bearing assembly according to the first preferred embodiment of the present invention, showing a condition before the crimping process is performed.
Figure 5:
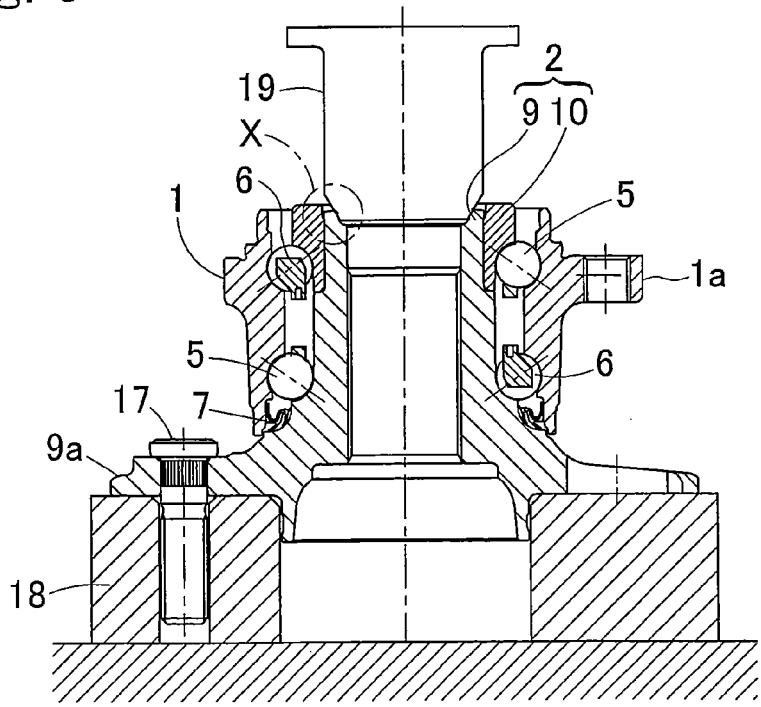
FIG. 5 is an explanatory diagram of the wheel support bearing assembly according to the first preferred embodiment of the present invention, showing a condition in which the crimping process is being.
Figure 6:
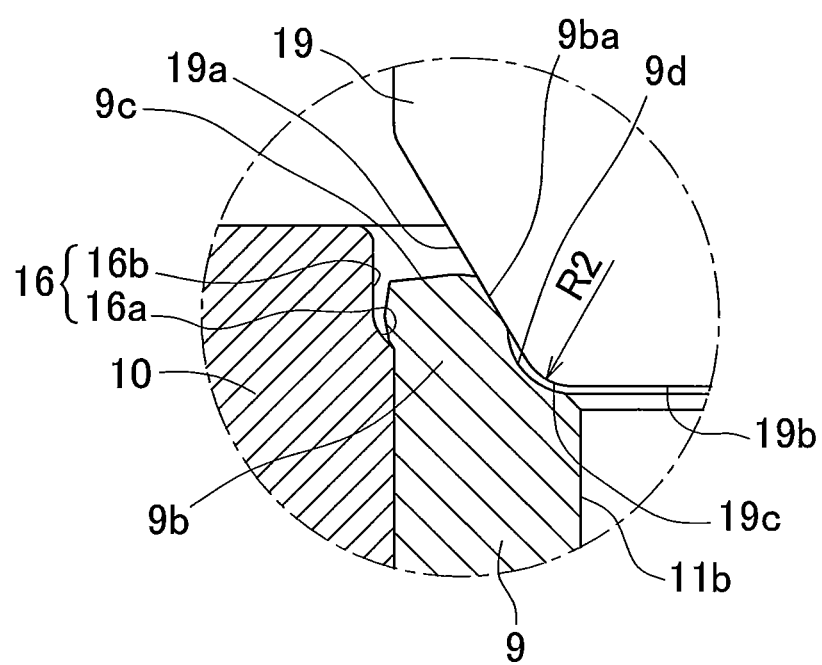
FIG. 6 is a view showing a portion of FIG. 5, encompassed by the circle X, on an enlarged scale.

Hereinafter, a method of crimping the plastically deformed portion 9b of the hub axle 9 into the inner race segment stepped area 16 will be described in detail with particular reference to FIGS. 4 to 8. In this crimping process, as shown in FIG. 4, the hub flange 9a integral with the hub axle 9 is mounted on a support bench 18 by means of the hub bolts 17 so that the bearing assembly can rest on the support bench 18 with the inboard side thereof oriented upwardly. With the bearing assembly so placed as hereinabove described, as shown in FIG. 5 and FIG. 6 showing the portion X of FIG. 5 on an enlarged scale, the crimping punch 16 of a structure, in which the front end portion outer peripheral surface is formed as a tapered surface 19a and a corner delimited between this tapered surface 19a and the front end face 19b is chamfered to define a chamfer (symbol R2), is lowered to a position above the inboard end of the hub axle 9 and the front end, which is tapered as at 19a, is pressed into the inner peripheral surface of the hub axle 9 to allow the plastically deformed portion 9b of the hub axle 9 to be press worked. The pressing of the crimping punch 19 is carried out while the inner race segment 10 has its outer diametric surface held in a non-constricted state. At this time, the outer diameter of the plastically deformed portion 9b after the crimping process can be adjusted by controlling the stroke in which the crimping punch 19 is axially pressed. The stroke control can be accomplished according to one of the following three methods.

Figure 7A:
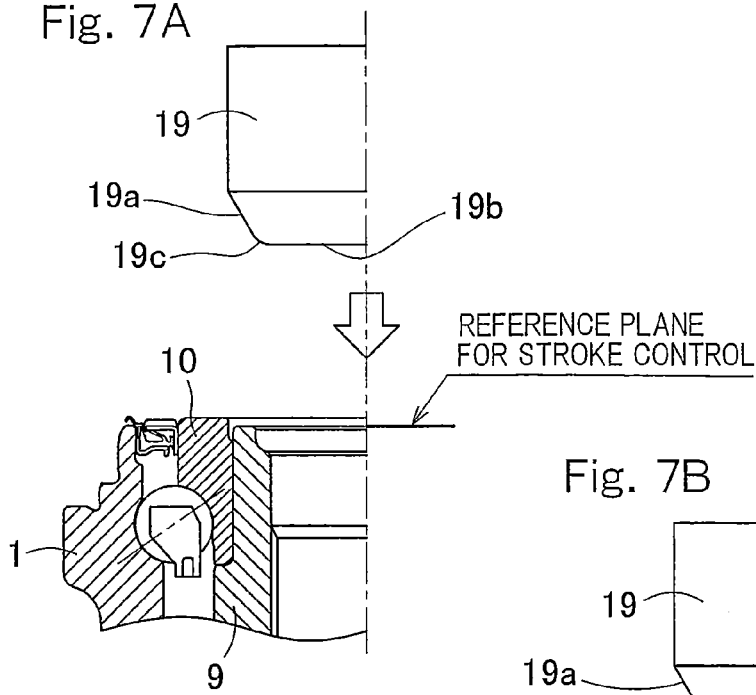
FIG. 7A is an explanatory diagram of the wheel support bearing assembly according to the first preferred embodiment of the present invention, showing a stroke control of a crimping punch during the crimping process performed, in which an end face of the hub axle is taken as a stroke reference.

FIG. 7A illustrates a method of controlling the stroke of the crimping punch 19 with the end face of the hub axle 9 taken as a stroke reference (zero point) for the crimping punch 19. According to this method, since the end face of the hub axle 9, which is an article to be processed, is used as a reference plane for the control, it is suited to control the degree of processing.

Figure 7B:
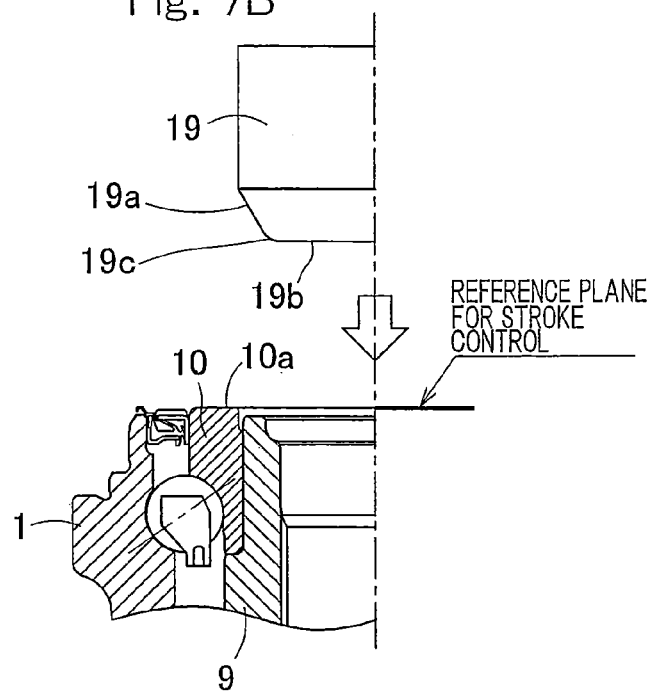
FIG. 7B is an explanatory diagram showing the stroke control according to another method, in which an end face of an inner race segment is taken as a stroke reference.

FIG. 7B illustrates a method of controlling the stroke of the crimping punch 19 with the annular face 10a of the inner race segment 10 taken as a stroke reference (zero point) for the crimping punch 19. According to this method, since the annular face 10a of the inner race segment 10, which is a ground surface, is used as a reference plane for the control, it is possible to accomplish a highly precise control.

Figure 7C:
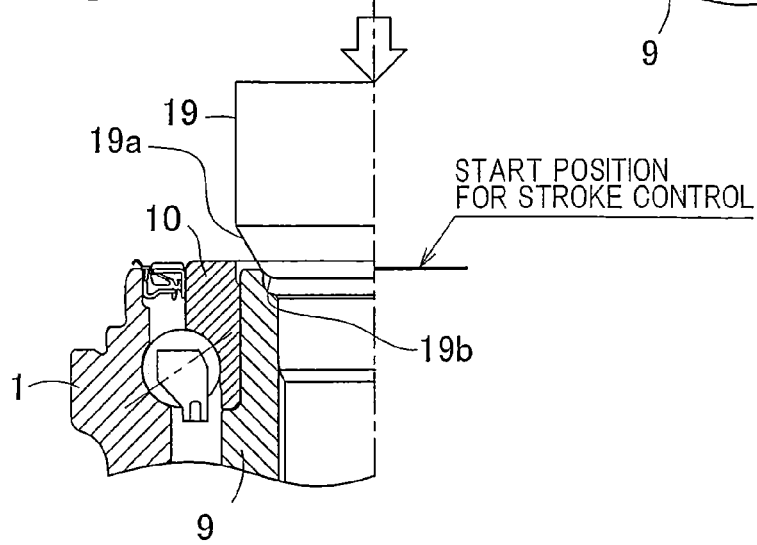
FIG. 7C is an explanatory diagram showing the stroke control according to a different method, in which the position at which the crimping punch is brought into contact with the hub axle is taken as a stroke reference.

FIG. 7C illustrates a method of controlling the stroke of the crimping punch 19 so that while the position, at which the crimping punch 19 or a plane, spherical or conical jig for detecting the reference plane contacts the hub axle 9, is used as a reference plane (zero point) for the control, the crimping punch 19 can be lowered a predetermined stroke from such position. According to this method, since the starting point of the crimping process is used as a reference plane for the control, it is possible to secure a stable degree of processing without being affected by a variation in tolerance of, for example, the position of the end face and/or inner diameter of the hub axle 9.

In any of those control methods, since the outer and inner diameters of the plastically deformed portion 9b after the crimping has been completed are adjusted by adjusting the axial stroke over which the crimping punch 19 is pressed axially, the wheel support bearing assembly can be manufactured stably at all times with high precision with being less affected by a factor (matrix hardness, heat treatment range, shape and dimensions of the plastically deformed portion 9b and others), which results in variation in processing precision resulting from the hub axle 9, which is an article to be processed, and a condition (surface deterioration, condition of oil sticking thereto and others) of the crimping punch. Since those control methods can bring about different advantages and have different applicability, one of those control methods, which is considered optimum, should be selected in consideration of the various conditions such as shape of the bearing, application and others.

When the press work is carried out while the stroke of the crimping punch 19 is adjusted according to one of the above discussed control methods, the plastically deformed portion 9b of the hub axle 9 can be crimped in the inner race segment stepped area 16 as shown in FIG. 6 showing that portion X of FIG. 5 on an enlarged scale.

Here, for the purpose of explaining the reason that in the illustrated embodiment the corner delimited between the tapered surface and the front end face of the crimping punch 19 is chambered, the conventionally practiced crimping process will be discussed with particular reference to FIGS. 20A and 20B and FIGS. 21A and 21B.

Figure 20A:
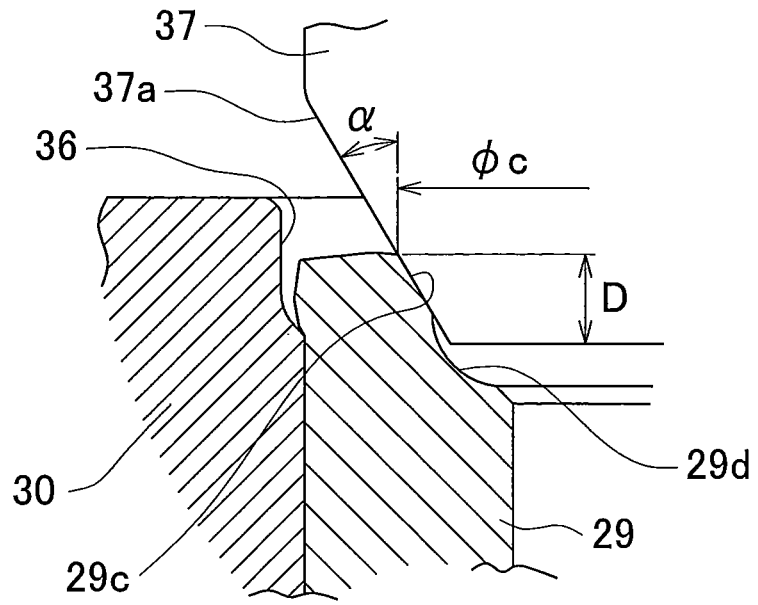
FIGS. 20A and 20B are explanatory diagrams of tentatively planned versions of the wheel support bearing assembly, showing conditions in which the crimping process is performed, respectively.
Figure 20B:
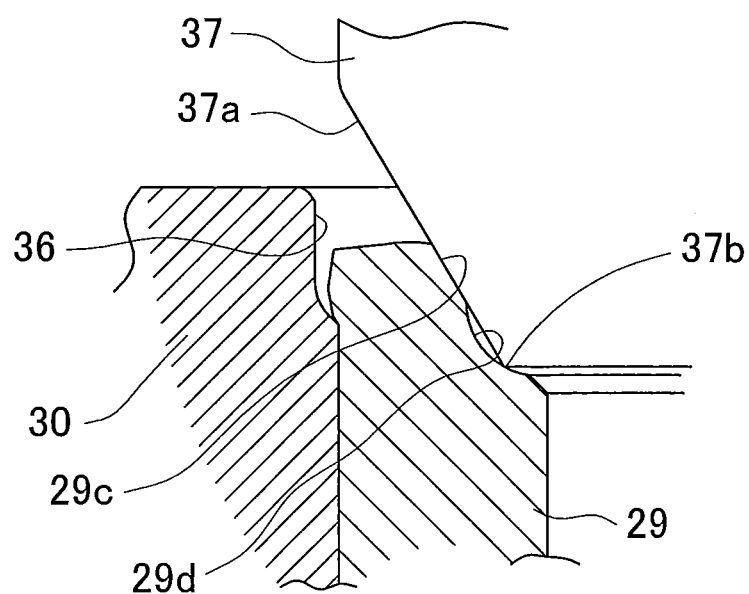

The crimping equipment is desirable if it can be available at a low cost and compact in size and, for this reason, it is necessary to minimize the processing load as much as possible. In order to minimize the processing load, the tapering angle α of the tapered surface 37a of the crimping punch 37 as shown in FIG. 20A is preferably of a small value. However, where the diametric expansion is desired to the same diameter (φc in FIG. 20A), the smaller the tapering angle α, the longer the axial dimension D required by the hub crimping surface 29c as shown in FIG. 20A. If this axial dimension D is large, it may occur that the free end corner 37b of the crimping punch 37 will interfere with a root 29d of the hub crimping portion as shown in FIG. 20B.

Figure 21A:
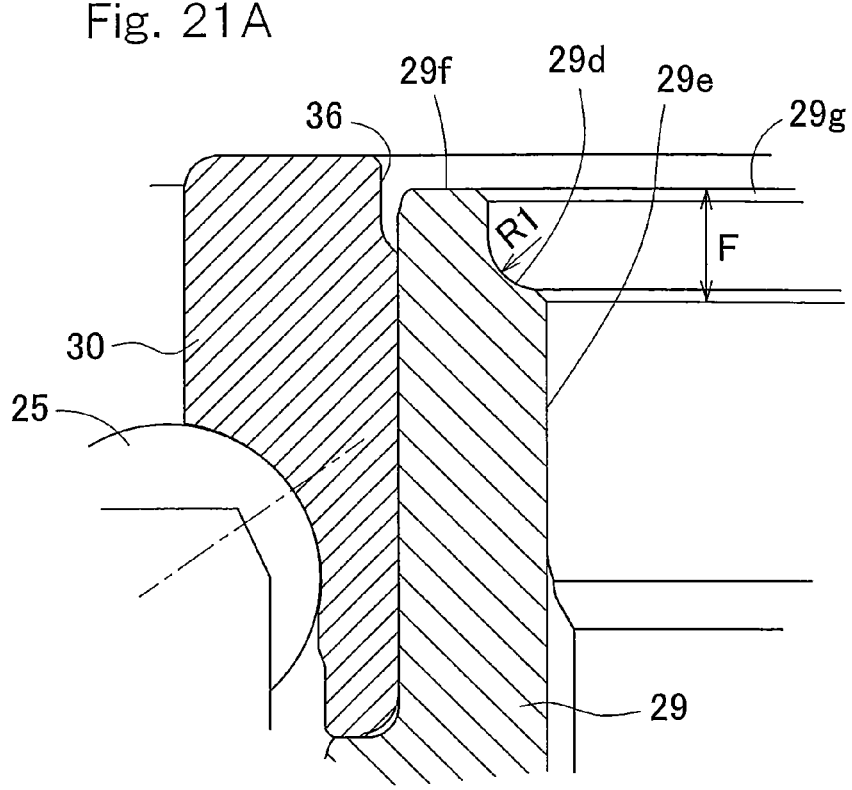
FIGS. 21A and 21B are explanatory diagrams of tentatively planned versions of the wheel support bearing assembly, showing other conditions in which the crimping process is performed, respectively.
Figure 21B:
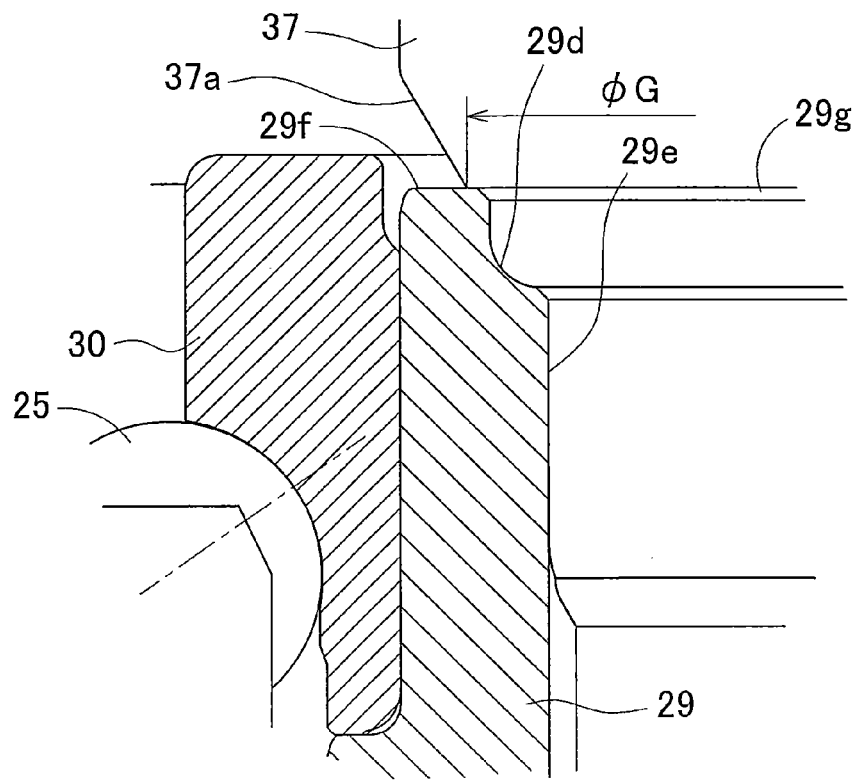

On the other hand, the hub inner diametric surface 29e shown in FIG. 21A will define a guide surface for the stem portion of the constant velocity universal joint and, in order to secure a guide length, the crimping allowance (F dimension) cannot take a large value. Also, if the R portion (symbol R1) of the root 29d of the hub crimping portion is reduced, it will result in lowering of the rigidity of the hub. Yet, as shown in FIG. 21B, if the free end length of the punch 37 is decreased and the free end diameter (PG is increased, the free end face of the punch 37 will contact the hub end face 29f and/or the chamfered portion 29g and this may lead to difficulty in accomplishing the crimping and also to formation of burrs.

In contrast thereto, in the embodiment shown in FIG. 6, at the time of crimping, since the free end portion outer peripheral surface of the crimping punch 19 represents the tapered surface 19a and the corner between this tapered surface 19a and the free end face 19b is chamfered to define the chamfer R2, there is no possibility that the free end corner 19c of the crimping punch 19, which has been chamfered, will interfere with the root of the hub crimping portion (root of the stepped large diametric portion 11c) 9d even though in order to reduce the processing load, the angle α (See FIG. 20A.) of the tapered surface 19a of the crimping punch 19 is reduced and, as a result thereof, the axial dimension D (See FIG. 20A.) required by a hub crimping surface 9ba that is formed in the stepped large diametric portion 11c of the hub center bore 11 increases.

Also, since the punch free end corner and the hub crimping root 9d do not interfere with each other, it is possible to secure a hub inner diametric surface, which defines a guide surface for the stem portion 13a (See FIG. 1.) of the constant velocity universal joint 12, that is, a guide length of the stepped intermediate diametric portion 11b of the hub center bore 11. Furthermore, there is no possibility that reduction of the free end length of the crimping punch 19 and increase of the free end diameter do not result in difficulty in accomplishing the crimping, because of contact of the free end face of the punch 19 with the hub end face 9c and/or the chamfered portion (See FIGS. 21A and 21B.) during the crimping, and/or occurrence of burrs.

Figure 8:
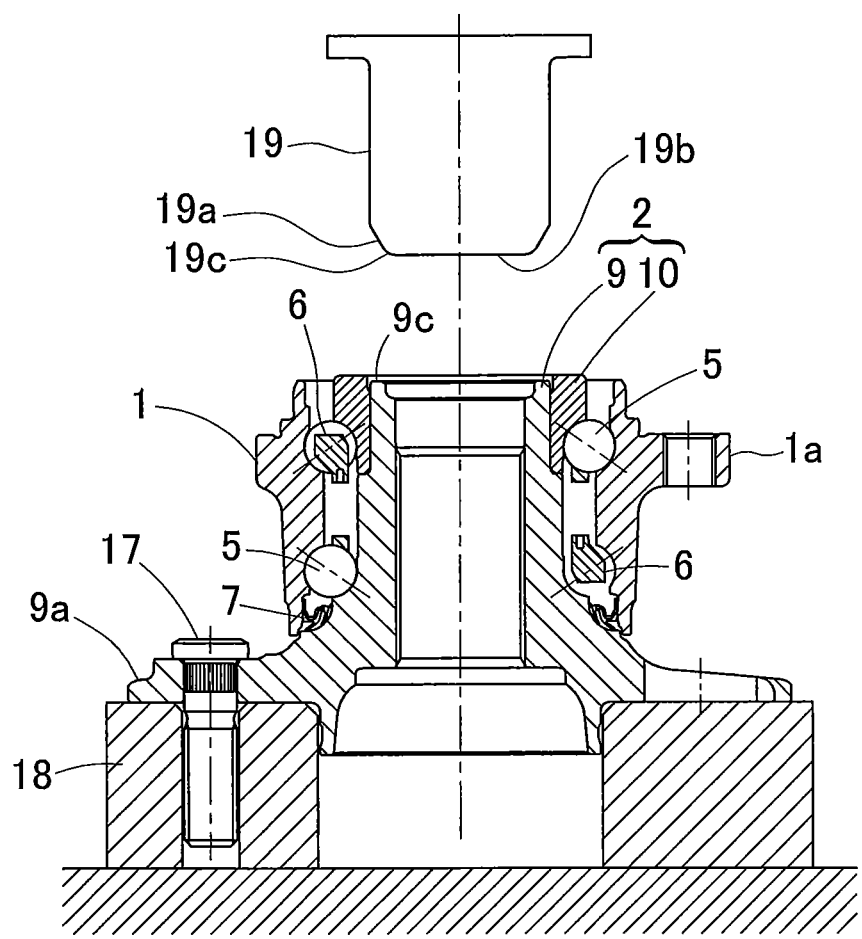
FIG. 8 is an explanatory diagram of the wheel support bearing assembly, showing a condition after the crimping process is completed.

As discussed above, the crimping can be carried out smoothly. And a portion of the hub axle 9, which eventually forms the plastically deformed portion 9b, has an inner diametric surface that is large in diameter and has a small wall thickness before and after the crimping processing takes place. When after the crimping has been completed, the crimping punch 19 is retracted from the inboard end portion of the hub axle 9 as shown in FIG. 8, the crimping completes.

According to the foregoing manufacturing method, the stroke, over which the crimping punch 19 is pressed axially, can be adjusted in dependence on the factor, which results in variation in processing precision resulting from the hub axle 9, which is an article to be processed and the condition of the crimping punch 19. Because of this, the press work can be performed at all time stably to such an extent that the height h of projection of the plastically deformed portion 9b in the radial direction may attain a required value, thus ensuring prevention of the inner race segment 10 from being detached in the completed product. Since this crimping process is carried out by pressing the crimping punch 19, in which the free end portion outer peripheral surface represents the tapered surface 19a and the corner 19c between this tapered surface 19a and the free end face 19b are chamfered, axially into the inner periphery of the inboard end portion of the hub axle 9, no interference of the crimping punch 19 with the inner race segment 10 and the hub axle 9 during the crimping process occur and the diameter expansion and crimping process can be accurately and easily accomplished to a required degree of processing.

In the next, a second preferred embodiment of the present invention will now be described with particular reference to FIGS. 9 and 10 and also to FIG. 1 used in describing the first preferred embodiment. In this embodiment, component parts similar to those shown in and described with reference to FIG. 1 are designated by like reference numerals used in FIG. 1 and the details thereof are not reiterated for the sake of brevity.

Figure 9:
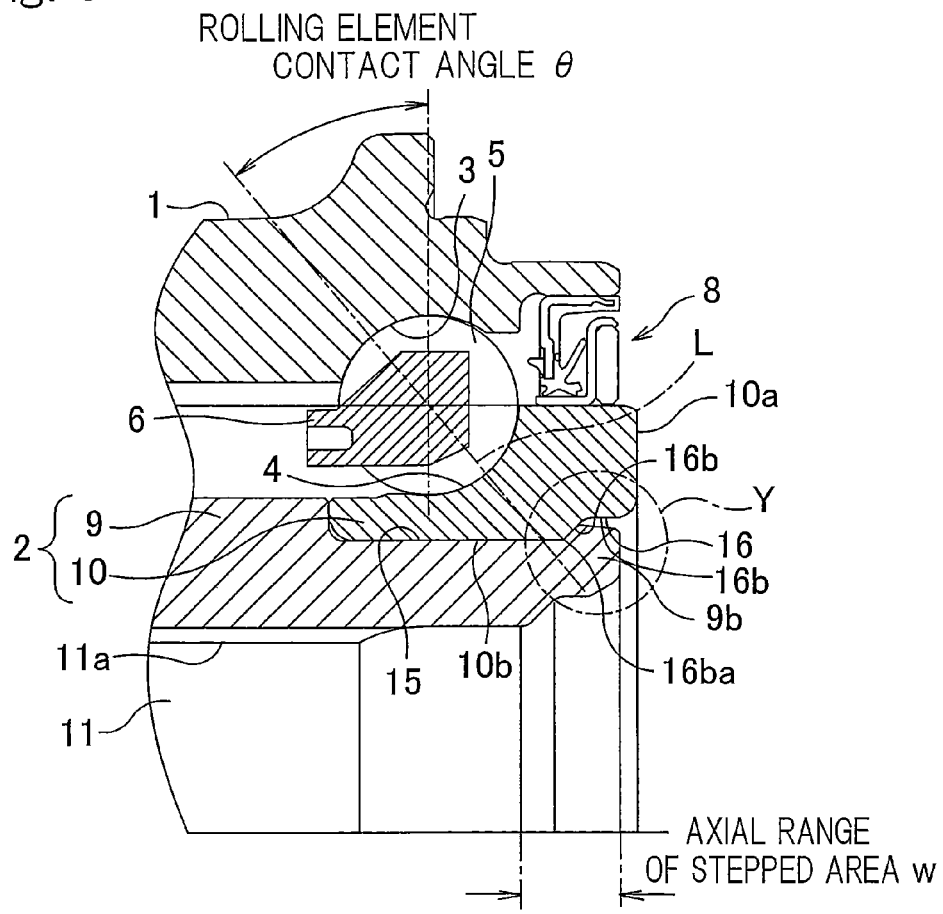
FIG. 9 is a fragmentary longitudinal sectional view showing the wheel support bearing assembly according to the second preferred embodiment of the present invention.
Figure 10A:
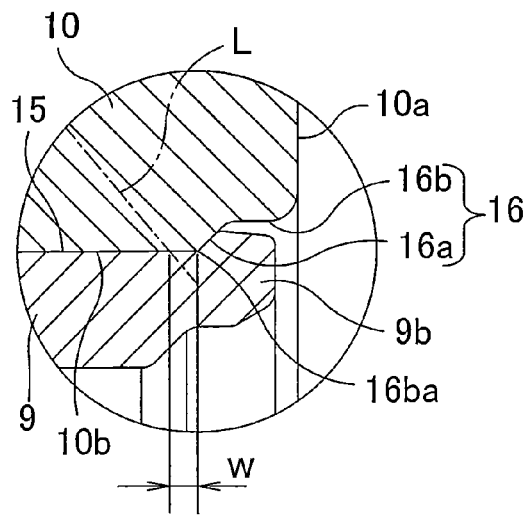
FIG. 10A is a sectional view showing, on an enlarged scale, a portion of FIG. 9 encompassed by the circle Y.

As shown in FIG. 9 illustrating, on an enlarged scale, the wheel support bearing assembly shown in FIG. 1, the annular stepped area 16 of the inner race segment 10 is machined and, after this machining, the hub axle mounting surface 10b, which is an inner race segment diametric surface portion continued from the annular stepped area 16, is ground to define a ground surface. Accordingly, as shown in FIG. 10A showing, on an enlarged scale, a section of that portion Yin FIG. 9, a transit portion 16ba between the hub axle mounting surface 10b and the inclined surface portion 16a within the stepped area 16 is rendered to represent a sharp corner shape. The axial range W (FIG. 9) of the stepped area 16 is so chosen as to be within the range which does not intersect a line of extension L of the rolling element contact angle θ. This axial range W of the stepped area 16 represents W>0 (that is, the transit portion 16ba shown in FIG. 9 or FIG. 10 is positioned on the right (inboard side) of the line of extension L of the contact angle).

Figure 10B:
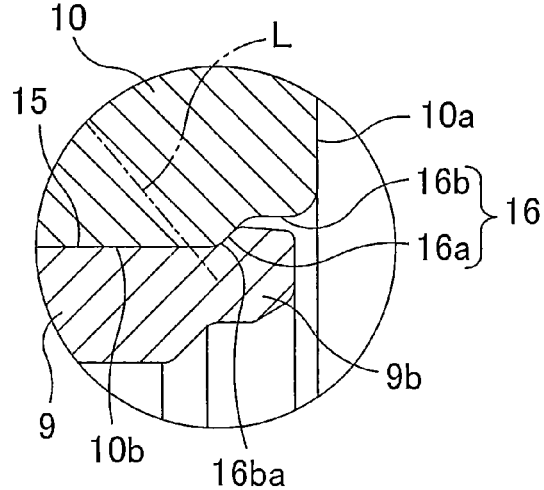
FIG. 10B illustrates a comparative example, in which that portion of FIG. 9, encompassed by the circle Y in FIG. 9, is structured differently.

FIG. 10B illustrates, on an enlarged scale, a comparative example, in which after the hub axle mounting surface 10b has been ground, the annular stepped area 16 is ground. In this comparative example, the transit portion 16ba between the hub axle mounting surface 10b and the inclined surface portion 16a of the stepped area 16 represents an arcuately sectioned curved portion of R0.3 (mm).

The inboard end portion of the hub axle 9 is provided with the plastically deformed portion 9b by means of the crimping process, in which portion 9b is engageable with the inclined surface portion 16a that is rendered to be a tapered surface in the inner surface of the stepped area 16 of the inner race segment 10. It is to be noted that FIG. 9 illustrates a condition of the plastically deformed portion 9b after the latter has been crimped. This plastically deformed portion 9b does not protrude outwardly from the annular face 10a of the inner race segment 10. Also, the plastically deformed portion 9b is so formed as to bring about a radial gap between it and the straight area portion 16b of the stepped area 16. The crimping process referred to above is applied over the entire circumference by means of, for example, a press work. This crimping process is carried out by means of a diametric expansion crimping, in which the entire circumference of the inboard end portion of the hub axle 9 is expanded radially outwardly. The plastically deformed portion 9b of the hub axle 9, where the crimping is performed, is rendered to be a non-heat treated portion. Also, the plastically deformed portion 9b, where the crimping is performed, represents a cylindrical portion before the crimping is performed, and such cylindrical portion has a diameter greater than that of the remaining portion of the hub axle 9 and also has a wall thickness smaller than that of the remaining portion of the hub axle 9.

It is to be noted that the wheel support bearing assembly of the present invention can be utilized in various standard automotive vehicles ranging from, for example, a compact car to a large size automobile and, therefore, has dimensions appropriate to such standard automotive vehicle.

According to the wheel support bearing assembly of the foregoing embodiment, since the hub axle mounting surface 10b, which is an inner diametric portion continued to the annular stepped area 16, is rendered to be a ground surface and the transit portion 16ba between this hub axle mounting surface 10b and the inclined surface portion 16a of the stepped area 16 is rendered to represent the sharp corner shape, adherence of the plastically deformed portion 9b to the stepped area 16 resulting from the crimping can be increased and the amount of movement of the inner race segment 10 relative to the hub axle 9, which would occur when an external force acts during assemblage onto the vehicle body, can be minimized.

The following Table 1 illustrates results of inner race segment drawing experiments conducted on the wheel support bearing assembly according to this embodiment, in which the inner race segment stepped area 16 is of the structure shown in FIG. 10A, and the wheel support bearing assembly as a comparative example, in which the inner race segment stepped area is of the structure shown in FIG. 10B. The crimping force applied in this case is 140 kN and the amount of movement of the inner race segment was that when loaded with 20 kN.

TABLE 1

| | Crimping Force | Inner race segment Movement Amt. when loaded with 20 kN. |
|---|---|---|
| Embodiment | 140 kN | 30 to 33 μm |
| Comparison | | 47 to 50 μm |

From the results of experiments, it can readily be seen that as compared with the amount of movement of the inner race segment exhibited by the comparative example (47 to 50 μm), the amount of movement of the inner race segment in the second preferred embodiment (30 to 33 μm) is small.

Also, even in this embodiment, since the inclined surface portion 16a within the stepped area 16 is rendered to be a tapered surface inclined relative to the axial direction of the inner race segment 10, as compared with the case in which this end face 16b is rendered to be a vertical surface, the plastically deformed portion 9b of the hub axle 9 can, when crimped, deform plastically so as to contact with no gap and, therefore, the reliability in engagement with the stepped area 16 will become excellent. For this reason, the crimping of the plastically deformed portion 9b can be facilitated.

Yet, since the axial range W (FIG. 9) of the stepped area 16 between the transit portion 16ba and the end face 10a of the inner race segment 10a lie within a range, in which it does not intersect the line of extension L of the rolling element contact angle θ, there is no possibility that the sharp corner shape of the transit portion 16ba may be ruined by an inner race segment deformation under an imposed load during assemblage onto the automotive vehicle and, therefore, the amount of movement of the inner race segment can be reduced.

Hereinafter, a third preferred embodiment of the present invention will be described with particular reference to FIGS. 11 to 17. It is however to be noted that in this embodiment, component parts similar to those employed in the first and second embodiments are designated by like reference numerals used therein and, therefore, the details thereof are not reiterated for the sake of brevity.

Figure 11:
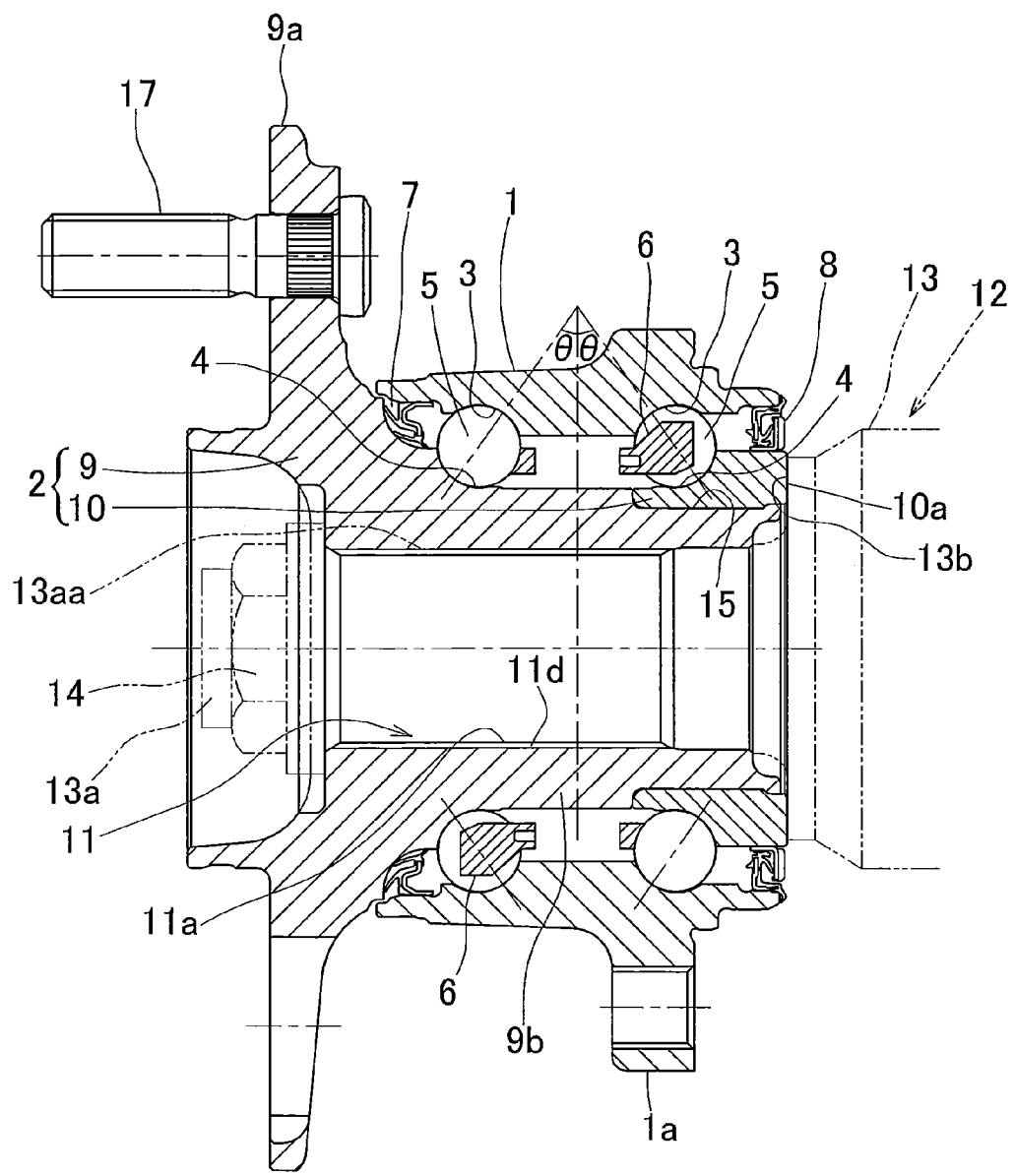
FIG. 11 is a longitudinal sectional view showing a wheel support bearing assembly according to a third preferred embodiment of the present invention.
Figure 12:
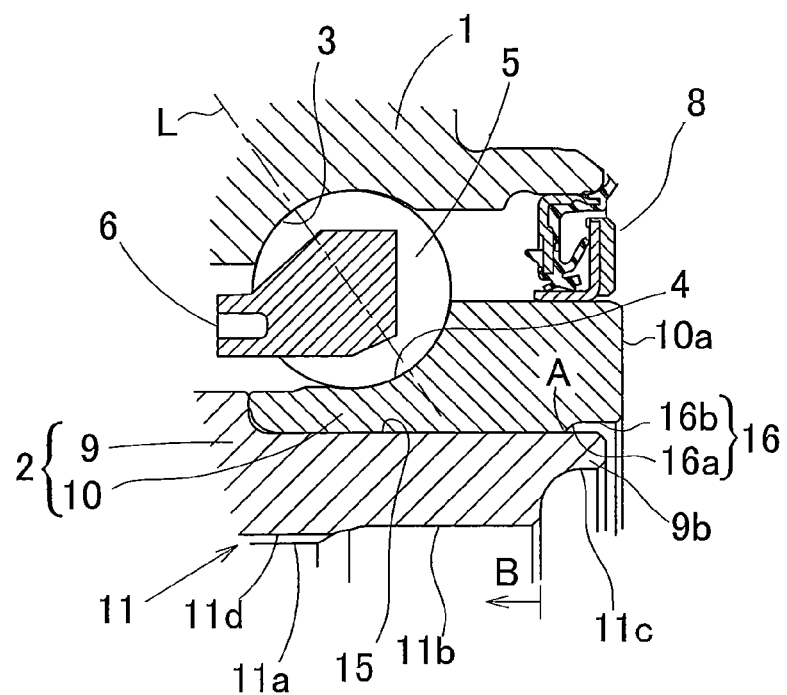
FIG. 12 is a fragmentary longitudinal sectional view of the wheel support bearing assembly according to the third preferred embodiment of the present invention, showing a condition before the hub axle crimping process is performed.
Figure 14:
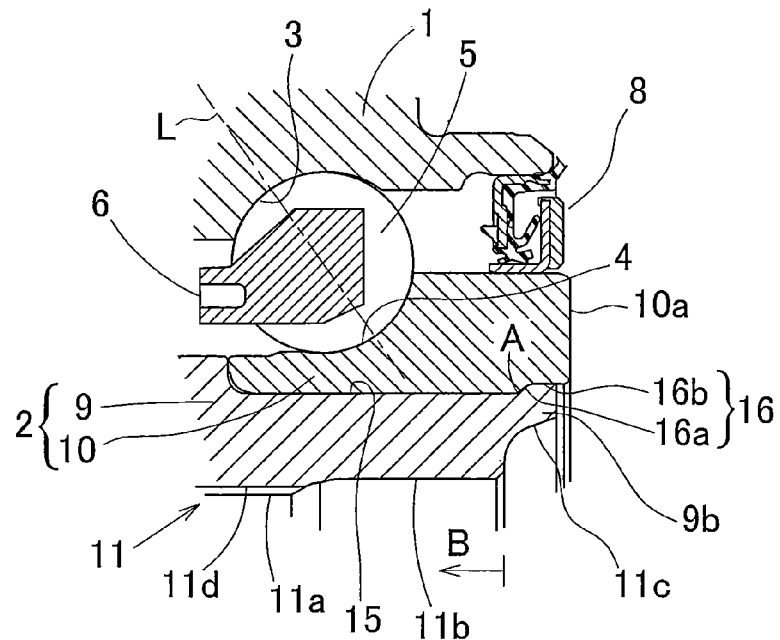
FIG. 14 is a fragmentary longitudinal sectional view, on an enlarged scale, of the wheel support bearing assembly according to the third preferred embodiment of the present invention, showing the condition after the hub axle crimping process.

The wheel support bearing assembly according to the third preferred embodiment is shown in FIG. 11 and an enlarged sectional view thereof is shown in FIGS. 12 and 14.

The inboard end portion of the hub axle 9 is provided by the crimping process with the plastically deformed portion 9b engageable with the inclined surface portion 16a from the axial direction of the annular stepped area 16 of the inner race segment 10. It is to be noted that FIG. 12 illustrates a condition before the crimping process is carried out to form the plastically deformed portion 9b whereas FIG. 14 illustrates a condition after the crimping has been carried out. Although the plastically deformed portion 9b is of a type that does not protrude outwardly from the annular face 10a of the inner race segment 10, the plastically deformed portion 9b in this embodiment may or may not contact the inner diametric surface of the annular stepped area 16 of the inner race segment 10. The plastically deformed portion 9b has a hardness equal to or lower than HRC 28.

The inner peripheral surface of the center bore 11 of the hub axle 9 includes the general diametric portion 11a, in which the splined grooves 11d are formed. Also, the periphery of the center bore 11 of the hub axle 9 includes a double stepped portion situated on the inboard side of the general diametric portion 11a. The double stepped portion includes the stepped large diametric portion 11c on the inboard side, and the stepped intermediate diametric portion 11b having a diameter smaller than that of the large diametric portion 11c, but greater than the maximum diameter of the general diametric portion 11a as measured between radially opposed groove bottoms of the splined grooves 11d. The large diametric portion 11c has an outer peripheral wall portion representing a cylindrical portion where the crimping is carried out. Also, the intermediate diametric portion 11b is held at a position B axially deeper than an axial position A of the stepped area 16 of the inner race segment 10.

Figure 13:
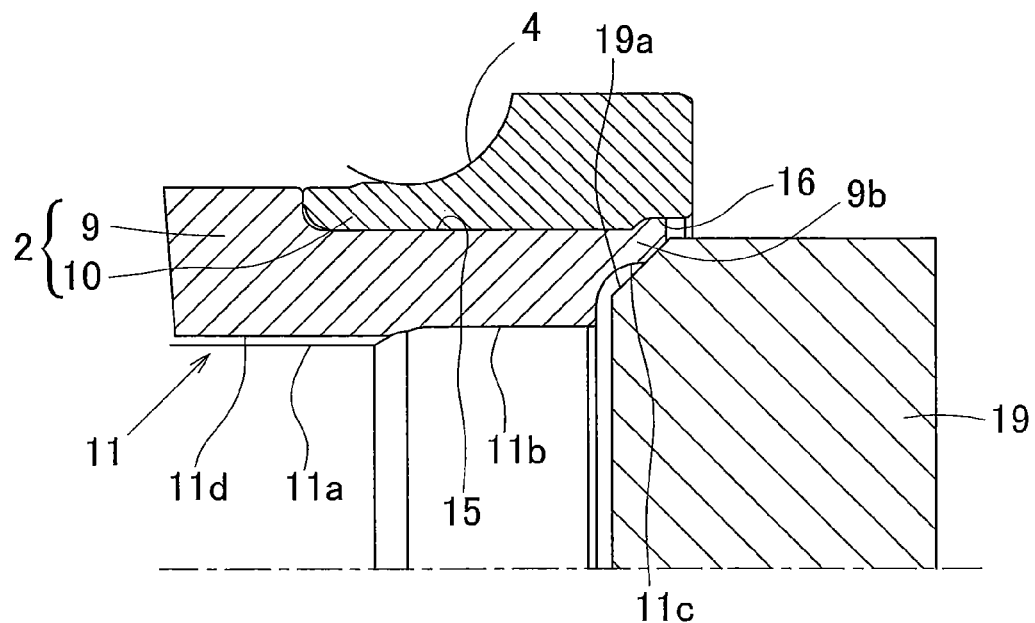
FIG. 13 is an explanatory diagram of the wheel support bearing assembly according to the third preferred embodiment, showing the hub axle crimping process.

The crimping process referred to above is carried out by the use of the crimping punch 19 of a type shown in FIG. 13. This crimping punch 19 has a free end portion outer periphery rendered to be a tapered surface 19a serving as an abutment surface and, by pressing this tapered surface 19a into an open edge at an inner periphery of the cylindrical portion of the plastically deformed portion 9b, the cylindrical portion referred to above can be crimped to an expanded diameter to thereby form the plastically deformed portion 9b.

Figure 15:
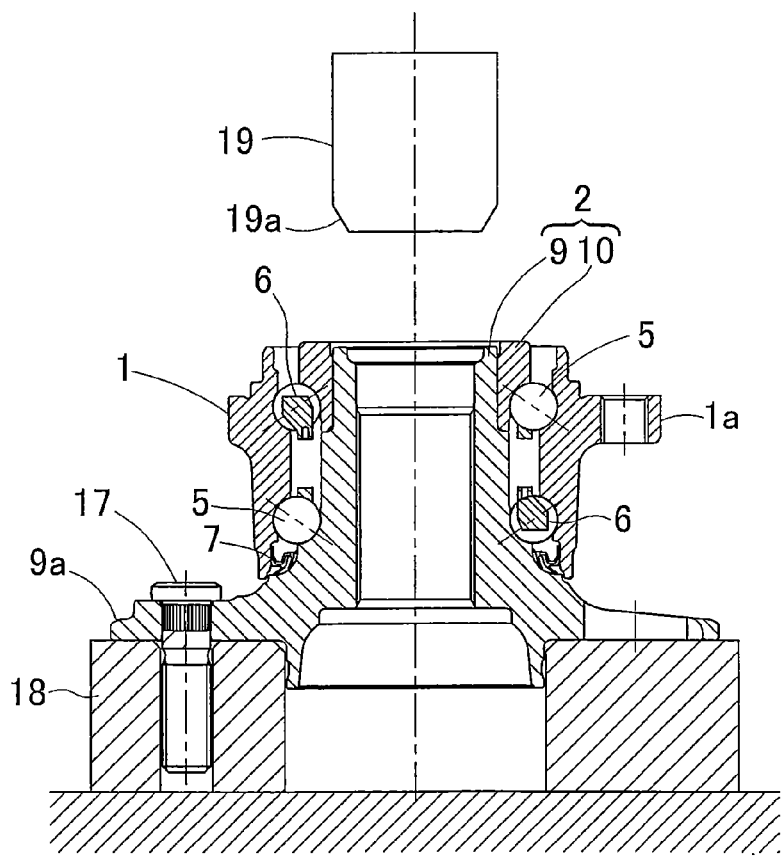
FIG. 15 is an explanatory diagram of the wheel support bearing assembly according to the third preferred embodiment of the present invention, showing the condition before the hub axle crimping process is performed.

FIGS. 15 and 16 illustrate the crimping process discussed hereinabove. In this crimping process, the bearing assembly is first placed on a support bench 18 with the inboard side thereof oriented upwardly as shown in FIG. 15. In this condition before the crimping, a lubricant oil is applied to one or both of the inner peripheral surface of the cylindrical portion of the hub axle 9 and the free end outer peripheral surface of the crimping punch 19. For the lubricant oil used in this case, a lubricant oil containing molybdenum can be suitably employed. With the lubricant oil so applied, the crimping punch 19 is lowered onto the inboard end face of the hub axle 9 as shown in FIG. 16A to conduct the crimping process as explained with reference to FIG. 13. FIG. 16B illustrates a fragmentary enlarged view showing the crimping taking place as shown in FIG. 16A. When the crimping punch 19 is thereafter retracted from the inboard side of the hub axle 9, the crimping completes.

As hereinabove described, in the crimping process, since before the crimping is performed with the crimping punch 19, the lubricant oil is applied to one or both of the inner peripheral surface of the cylindrical portion of the hub axle 9 and the outer periphery of the free end portion of the crimping punch 19, and the crimping is carried out in this oil applied condition, it is possible to avoid a clinging or seizure that may occur at a portion of the hub axle 8, where the crimping punch 19 contacts, thereby resulting in not only increase of the quality of appearance of the product, but also increase of the lifetime of the crimping punch 19. Also, application of the lubricant oil is effective to reduce the load during the process even though it is a product of the same degree of processing (that is, the same processing stroke) and, therefore, not only can the crimping be facilitated, but also the size of the crimping equipment can be minimized to minimize the equipment investment.

FIG. 17 illustrates the chart showing results of experiments conducted to determine the relation between the processing stroke of the crimping punch 19 and the processed load when the crimping is carried out in the oil applied condition as described above and when the crimping is carried out without the lubricant oil applied, respectively. It will readily be understood that from the results of experiments, the method in which the crimping is carried out with the lubricant oil applied has exhibited reduction of the processed load as compared with the method in which the crimping is carried out with no lubricant oil applied.

Preferred embodiments of the wheel support bearing assembly of the present invention of the structure described hereinbefore include the following modes:

The wheel support bearing assembly of the present invention, which forms a structure fundamental to the following modes of embodiment, is a wheel support bearing assembly for rotatably supporting a vehicle drive wheel, which includes an outer member having an inner periphery formed with a double row of raceway surfaces, an inner member having raceway surfaces formed therein and opposite to those raceway surfaces in the outer member, and a double row of rolling elements each row interposed between the respective raceway surfaces in the outer and inner members, in which the inner member is made up of a hub axle, having a wheel mounting hub flange formed in an outer periphery thereof and also having a center bore, and an inner race segment mounted on an outer periphery of an inboard end portion of the hub axle, with the raceway surfaces being defined respectively in the hub axle and the inner race segment; in which the inner race segment has an inner peripheral surface provided with an annular stepped area that extends to an inboard end face of the inner race segment and has a depth defined at an inner peripheral edge of an inboard end face of the inner race segment; and in which this annular stepped area is of a shape made up of a straight area portion in the form of a cylindrical surface and an inclined surface portion continued from a outboard end of the straight area portion to the inner peripheral surface of the inner race segment, and a plastically deformed portion engageable with the inclined surface portion of the annular stepped area in the inner race segment as a result of crimping of the hub axle is provided in the hub axle.

[Mode 1]

In the wheel support bearing assembly of the fundamental structure referred to above, the center bore of the hub axle has an inner peripheral surface formed with the splined grooves engageable with the splined projections in the outer peripheral surface of the stem portion of the constant velocity universal joint and a portion located on an inboard side of the general diametric portion, where the splined grooves in the inner peripheral surface of the center bore, is of a double stepped configuration made up of the stepped large diametric portion, which defines the inner peripheral surface of the plastically deformed portion, and the stepped intermediate diametric portion having a diameter smaller than that of the large diametric portion, but greater than that of the general diametric portion.

Where this mode of embodiment is employed, the inboard end portion of the hub axle, in which the large diametric portion of the center bore defines the inner peripheral surface, is crimped as the plastically deformed portion to avoid the detachment of the inner race segment during the assemblage onto the automotive vehicle, and the splined projections on the stem portion outer periphery of the constant velocity universal joint are engaged in the respective splined grooves formed in the general diametric portion of the center bore to thereby cause the stem portion of the constant velocity universal joint to be splined to the center bore.

Since the plastically deformed portion referred to above is a portion of the hub axle, where the inner diameter is large and the wall thickness is small, and the volume of the entirety thereof is small, it makes it possible to render the inner race segment stepped area to be small, facilitating the crimping process. Also, since the center bore is rendered to be of a double stepped configuration, in which the inner diameter is large on the inboard side, the stem portion of the constant velocity universal joint can be easily inserted from the inboard side, when the stem portion of the constant velocity universal joint is splined to the general diametric portion of the center bore, thus facilitating the assembly.

[Mode 2]

In the wheel support bearing assembly of the fundamental structure referred to above, the raceway surface in the hub axle is rendered to be a surface hardened, the plastically deformed portion is rendered to be the non-heat treated portion, and the inner race segment is hardened in its entirety from surface to core by means of a hardening treatment.

Although the raceway surface in the hub axle is preferred to represent the hardened surface having an increased hardness in order to increase the rolling lifetime, that portion where the crimping is carried out is preferred to be the non-heat treated portion in order to facilitate the crimping. Since the inner race segment is a small component part having the raceway surface and has the inner diametric surface engaged in the hub axle, to use the hardening treatment to make it to be hardened from surface to core is preferred in terms of increase of the rolling lifetime and the frictional resistance of the mounting surface.

[Mode 3]

In the wheel support bearing assembly of the fundamental structure referred to above, the axial range of the stepped area is so chosen to be within the range that does not intersect the line of extension of the rolling element contact angle.

Where the axial range of the stepped area intersects the line of extension of the rolling element contact angle, there is the possibility that deformation of the inner race segment under the influence of the imposed load during the operation would be considerable. Since the axial range is so chosen to be within the range that does not intersect the line of extension of the rolling element contact angle, such deformation of the inner race segment under the influence of the imposed load during the operation can be minimized while securing the bearing strength against the possible detachment and, accordingly, it is possible to avoid the reduction of the rolling lifetime and the frictional wear of the mounting surface.

The following modes of developed examples to the wheel support bearing assembly of the above described fundamental structure are also available:

[Mode 4]

The wheel support bearing assembly of the present invention, which forms a structure fundamental to the following modes of embodiment, is a wheel support bearing assembly for rotatably supporting a vehicle drive wheel, which includes an outer member having an inner periphery formed with a double row of raceway surfaces, an inner member having raceway surfaces formed therein and opposite to those raceway surfaces in the outer member, and a double row of rolling elements each row interposed between the respective raceway surfaces in the outer and inner members, in which the inner member is made up of a hub axle, having a wheel mounting hub flange formed in an outer periphery thereof and also having a center bore, and an inner race segment mounted on an outer periphery of an inboard end portion of the hub axle, with the raceway surfaces being defined respectively in the hub axle and the inner race segment; in which an inner peripheral surface of the inner race segment is provided with an annular stepped area that extends to an inboard end face of the inner race segment and having a depth defined at an inner peripheral edge of an inboard end face of the inner race segment; the plastically deformed portion engageable with a stepped surface oriented in the axial direction of the stepped area in the inner race segment is provided in the hub axle by means of the crimping of the hub axle; the plastically deformed portion is rendered not to protrude outwardly beyond the end face of the inner race segment; a hub axle mounting surface, which is an inner diametric surface portion continued to the stepped area in the inner race segment is rendered to be the ground surface; a transit portion between the hub axle mounting surface and the stepped surface of the stepped area is rendered to represent the sharp corner shape.

[Mode 5]

In Mode 4 referred to above, the wheel support bearing assembly in which the stepped surface of the stepped area is rendered to be a tapered surface inclined relative to the axial direction of the inner race segment.

[Mode 6]

In Mode 4 referred to above, the wheel support bearing assembly in which the axial range of the stepped area is chosen to be the range which does not intersect the line of extension of the ball contact angle.

[Mode 7]

In Mode 4 referred to above, the wheel support bearing assembly in which the raceway surface of the hub axle is rendered to be a surface hardened; the plastically deformed portion is rendered to be the non-heat treated portion; and the inner race segment is hardened in its entirety from surface to core by means of the hardening treatment.

[Mode 8]

The wheel support bearing assembly of the present invention, which forms a structure fundamental to the following modes of embodiment, is a wheel support bearing assembly for rotatably supporting a vehicle drive wheel, which includes an outer member having an inner periphery formed with a double row of raceway surfaces, an inner member having raceway surfaces formed therein and opposite to those raceway surfaces in the outer member, and a double row of rolling elements each row interposed between the respective raceway surfaces in the outer and inner members, in which the inner member is made up of a hub axle, having a wheel mounting hub flange formed in an outer periphery thereof and also having a center bore, and an inner race segment mounted on an outer periphery of an inboard end portion of the hub axle, with the raceway surfaces being defined respectively in the hub axle and the inner race segment; in which the inner peripheral surface of the inner race segment is provided with an annular stepped area that extends to an inboard end face of the inner race segment and having a depth defined at an inner peripheral edge of an inboard end face of the inner race segment; the plastically deformed portion engageable with a stepped surface oriented in the axial direction of the stepped area in the inner race segment is provided in the hub axle; the plastically deformed portion is formed by pressing the crimping punch into the open edge of a cylindrical portion at the end of the hub axle to expand the diameter thereof; and a lubricant is applied to the surface of the plastically deformed portion with which the crimping punch contacts.

Also, the following modes of developed examples are available to the method of manufacturing the wheel support bearing assembly according to the present invention;

[Mode 9]

A method of manufacturing the wheel support bearing assembly of a structure, which includes an outer member having an inner periphery formed with a double row of raceway surfaces, an inner member having raceway surfaces formed therein and opposite to those raceway surfaces in the outer member, and a double row of rolling elements each row interposed between the respective raceway surfaces in the outer and inner members, in which the inner member is made up of a hub axle, having a wheel mounting hub flange formed in an outer periphery thereof and also having a center bore, and an inner race segment mounted on an outer periphery of an inboard end portion of the hub axle, with the raceway surfaces being defined respectively in the hub axle and the inner race segment; in which an inner peripheral surface of the inner race segment is provided with an annular stepped area extends to an inboard end face of the inner race segment and having a depth defined at an inner peripheral edge of an inboard end face of the inner race segment; and the plastically deformed portion engageable with a stepped surface oriented in the axial direction of the stepped area in the inner race segment is provided in the hub axle; and which method includes preparing a predecessor of the plastically deformed portion of the hub axle in the wheel support bearing assembly, which has not yet been cramped and is a cylindrical shape, pressing the crimping punch into the open edge of the cylindrical plastically deformed portion to expand the diameter thereof to allow the cylindrical plastically deformed portion to be crimped in the diameter expanded condition; and performing the crimping while, prior to the crimping with the crimping punch, a lubricant is applied to one or both of the inner peripheral surface of a cylindrical portion of the hub axle and the free end portion outer periphery of the crimping punch.

[Mode 10]

In Mode 9 referred to above, the center bore of the hub axle in the wheel support bearing assembly referred to above has an inner peripheral surface formed with the splined grooves engageable with the splined projections in the outer peripheral surface of the stem portion of the constant velocity universal joint; that inboard portion of the general diametric portion, where the splined grooves in the inner peripheral surface of the center bore, is of a double stepped configuration made up of the stepped large diametric portion, which defines the inner peripheral surface of the plastically deformed portion, and the stepped intermediate diametric portion having a diameter smaller than that of the large diametric portion, but greater than that of the general diametric portion; and the outer peripheral wall portion of the large diametric portion is the cylindrical portion where the crimping referred to above is carried out.

Since the inboard end portion of the center bore is so shaped as to represent the double stepped configuration as hereinabove described, the intermediate diametric portion serves as a guide when the stem portion of the constant velocity universal joint is to be inserted, resulting in increase of the assemblability. Also, since the inboard end portion of the center bore is so shaped as to represent the double stepped configuration, the cylindrical portion of the hub axle, where the crimping is performed, can have an increased wall thickness, thus facilitating the crimping.

[Mode 11]

In Mode 9 referred to above, the wheel support bearing assembly is such that the inner race segment is hardened from surface to core and the plastically deformed portion is rendered to be the non-heat treated portion, the surface of the inner race segment mounting portion of the hub axle being hardened in its entirety by means of the induction hardening technique.

The inner race segment is a small component part having the raceway surface and has the inner diametric surface engaged in the hub axle, hardening of the entirety from surface to core by means of the heat treatment is preferred in terms of increase of the rolling lifetime and the frictional resistance of the mounting surface. In view of the inner race segment being mounted on the surface of the inner race segment mounting portion in the hub axle, hardening of the entirety of the inner race segment mounting portion by means of the induction heat treatment is preferred in terms of increase of the frictional resistance. In contrast thereto, the plastically deformed portion is preferably rendered to be the non-heat treated portion in terms of easiness of crimping.

What is claimed is:

1. A method of manufacturing a wheel support bearing assembly, which comprises an outer member having an inner periphery formed with a double row of raceway surfaces, an inner member having raceway surfaces formed therein and opposite to those raceway surfaces in the outer member, and a double row of rolling elements each row interposed between the respective raceway surfaces in the outer and inner members; the inner member being made up of a hub axle, having a wheel mounting hub flange formed in an outer periphery thereof and also having a center bore, and an inner race segment mounted on an outer periphery of an inboard end portion of the hub axle; the hub axle and the inner race segment being formed with the rows of the raceway surfaces, respectively; and the inner race segment having an inner peripheral surface provided with an annular stepped area that extends to an inboard end of the inner race segment and has a depth defined at an inner peripheral edge of an inboard end face of the inner race segment, the annular stepped area being of a shape made up of a straight area portion in the form of a cylindrical surface and an inclined surface portion continued from an outboard end of the straight area portion to the inner peripheral surface of the inner race segment, and a plastically deformed portion engageable with the inclined surface portion of the annular stepped area in the inner race segment as a result of crimping of the hub axle being provided in the hub axle, the method comprising:

the plastically deformed portion, being of a cylindrical configuration before it is deformed, being formed by pressing a crimping punch, of which front end portion outer peripheral surface is a tapered shape, in only an axial direction into an inner peripheral surface of the inboard end portion of the hub axle to allow the cylindrical plastically deformed portion to be crimped in the diameter expanded condition by the front end portion outer peripheral surface of the tapered shape while an outer diametric surface of the inner race segment is held in a non-constricted state.

2. The method of manufacturing the wheel support bearing assembly as claimed in claim 1, further comprising adjusting an axial stroke, over which the crimping punch is pressed, to adjust an outer diameter of the plastically deformed portion after crimping has been carried out.

3. The method of manufacturing the wheel support bearing assembly as claimed in claim 1, further comprising applying a lubricant oil, before the crimping is performed with the crimping punch, to one or both of an inner peripheral surface of the cylindrical plastically deformed portion of the hub axle and the front end portion outer periphery of the crimping punch, the crimping being performed in a lubricant applied condition.

4. The method of manufacturing the wheel support bearing assembly as claimed in claim 1, wherein the crimping punch has a corner delimited between the tapered surface and a free end face, which corner is chamfered.

5. A method of manufacturing a wheel support bearing assembly, which comprises an outer member having an inner periphery formed with a double row of raceway surfaces, an inner member having raceway surfaces formed therein and opposite to those raceway surfaces in, the outer member, and a double row of rolling elements each row interposed between the respective raceway surfaces in the outer and inner members; the inner member being made up of a hub axle, having a wheel mounting hub flange formed in an outer periphery thereof and also having a center bore, and an inner race segment mounted on a stepped inner race segment mounting portion provided in an outer periphery of an inboard end portion of the hub axle, the hub axle and the inner race segment being formed with the rows of the raceway surfaces, respectively; and the inner race segment having an inner peripheral surface provided with an annular stepped area that extends to an inboard end of the inner race segment and has a depth defined at an inner peripheral edge of an inboard end face of the inner race segment, and a plastically deformed portion engageable with a stepped surface oriented in the axial direction of the stepped area in the inner race segment as a result of crimping of the hub axle, the method comprising:
preparing a predecessor of the plastically deformed portion of the hub axle in the wheel support bearing assembly, which has not yet been crimped and is a cylindrical shape;
pressing a crimping punch having a tapered outer peripheral surface of a free end portion, the outer peripheral surface serving as an abutment surface, in only an axial direction into the open edge of the cylindrical plastically deformed portion to expand the diameter thereof to allow the cylindrical plastically deformed portion to be crimped in the diameter expanded condition by the tapered outer peripheral surface of the crimping punch;
performing the crimping while an outer diametric surface of the inner race segment is held in a non-constricted state; and
prior to the crimping with the crimping punch, applying a lubricant to one or both of the inner peripheral surface of a cylindrical portion of the hub axle and the outer peripheral surface of the free end portion of the crimping punch.

6. The method of manufacturing the wheel support bearing assembly as claimed in claim 5, wherein the center bore of the hub axle in the wheel support bearing assembly has an inner peripheral surface formed with splined grooves engageable with splined projections in the outer peripheral surface of a stem portion of a constant velocity universal joint, and
the inboard side of the general diametric portion, where the splined grooves in the inner peripheral surface of the center bore is provided, is of a double stepped configuration made up of a stepped large diametric portion, which defines the inner peripheral surface of the plastically deformed portion, and a stepped intermediate diametric portion having a diameter smaller than that of the large diametric portion, but greater than that of the general diametric portion; and the outer peripheral wall portion of the large diametric portion is the cylindrical portion where the crimping is carried out.

7. The method of manufacturing the wheel support bearing assembly as claimed in claim 5, wherein the inner race segment is hardened from surface to core and the plastically deformed portion is the non-heat treated portion, the surface of the inner race segment mounting portion of the hub axle being hardened in its entirety by induction hardening.

8. A method of manufacturing a wheel support bearing assembly, which comprises an outer member having an inner periphery formed with a double row of raceway surfaces, an inner member having raceway surfaces formed therein and opposite to those raceway surfaces in the outer member, and a double row of rolling elements each row interposed between the respective raceway surfaces in the outer and inner members; the inner member being made up of a hub axle, having a wheel mounting hub flange formed in an outer periphery thereof and also having a center bore, and an inner race segment mounted on an outer periphery of an inboard end portion of the hub axle; the hub axle and the inner race segment being formed with the rows of the raceway surfaces, respectively; and the inner race segment having an inner peripheral surface provided with an annular stepped area that extends to an inboard end of the inner race segment and has a depth defined at an inner peripheral edge of an inboard end face of the inner race segment, the annular stepped area being of a shape made up of a straight area portion in the form of a cylindrical surface and an inclined surface portion continued from an outboard end of the straight area portion to the inner peripheral surface of the inner race segment, and a plastically deformed portion engageable with the inclined surface portion of the annular stepped area in the inner race segment as a result of crimping of the hub axle being provided in the hub axle, the method comprising:
the plastically deformed portion, being of a cylindrical configuration before it is deformed, being formed by pressing a crimping punch, of which front end portion outer peripheral surface is a tapered shape, in only an axial direction into an inner peripheral surface of the inboard end portion of the hub axle to allow the cylindrical plastically deformed portion to be crimped in the diameter expanded condition by the front end portion outer peripheral surface of the tapered shape to the extent that the cylindrical plastically deformed portion does not contact the straight area portion.

9. The method of manufacturing the wheel support bearing assembly as claimed in claim 8, further comprising adjusting an axial stroke, over which the crimping punch is pressed, to adjust an outer diameter of the plastically deformed portion after crimping has been carried out.

10. The method of manufacturing the wheel support bearing assembly as claimed in claim 8, further comprising applying a lubricant oil, before the crimping is performed with the crimping punch, to one or both of an inner peripheral surface of the cylindrical plastically deformed portion of the hub axle and the front end portion outer periphery of the crimping punch, the crimping being performed in a lubricant applied condition.

11. The method of manufacturing the wheel support bearing assembly as claimed in claim 8, wherein the crimping punch has a corner delimited between the tapered surface and a free end face, which corner is chamfered.

12. A method of manufacturing a wheel support bearing assembly, which comprises an outer member having an inner periphery formed with a double row of raceway surfaces, an inner member having raceway surfaces formed therein and opposite to those raceway surfaces in, the outer member, and a double row of rolling elements each row interposed between the respective raceway surfaces in the outer and inner members; the inner member being made up of a hub axle, having a wheel mounting hub flange formed in an outer periphery thereof and also having a center bore, and an inner race segment mounted on a stepped inner race segment mounting portion provided in an outer periphery of an inboard end portion of the hub axle, the hub axle and the inner race segment being formed with the rows of the raceway surfaces, respectively; and the inner race segment having an inner peripheral surface provided with an annular stepped area that extends to an inboard end of the inner race segment and has a depth defined at an inner peripheral edge of an inboard end face of the inner race segment, the annular stepped area being of a shape made up of a straight area portion in the form of a cylindrical surface and an inclined surface portion continued from an outboard end of the straight area portion to the inner peripheral surface of the inner race segment, and a plastically deformed portion engageable with a stepped surface oriented in the axial direction of the stepped area in the inner race segment as a result of crimping of the hub axle, the method comprising:

preparing a predecessor of the plastically deformed portion of the hub axle in the wheel support bearing assembly, which has not yet been crimped and is a cylindrical shape;

pressing a crimping punch having a tapered outer peripheral surface of a free end portion, the outer peripheral surface serving as an abutment surface, in only an axial direction into the open edge of the cylindrical plastically deformed portion to expand the diameter thereof to allow the cylindrical plastically deformed portion to be crimped in the diameter expanded condition by the tapered outer peripheral surface of the crimping punch to the extent that the cylindrical plastically deformed portion does not contact the straight area portion; and prior to the crimping with the crimping punch, applying a lubricant to one or both of the inner peripheral surface of a cylindrical portion of the hub axle and the outer peripheral surface of the free end portion of the crimping punch.

13. The method of manufacturing the wheel support bearing assembly as claimed in claim 12, wherein the center bore of the hub axle in the wheel support bearing assembly has an inner peripheral surface formed with splined grooves engageable with splined projections in the outer peripheral surface of a stem portion of a constant velocity universal joint, and the inboard side of the general diametric portion, where the splined grooves in the inner peripheral surface of the center bore is provided, is of a double stepped configuration made up of a stepped large diametric portion, which defines the inner peripheral surface of the plastically deformed portion, and a stepped intermediate diametric portion having a diameter smaller than that of the large diametric portion, but greater than that of the general diametric portion; and the outer peripheral wall portion of the large diametric portion is the cylindrical portion where the crimping is carried out.

14. The method of manufacturing the wheel support bearing assembly as claimed in claim 12, wherein the inner race segment is hardened from surface to core and the plastically deformed portion is the non-heat treated portion, the surface of the inner race segment mounting portion of the hub axle being hardened in its entirety by induction hardening.

* * * * *

UNITED STATES PATENT AND TRADEMARK OFFICE
CERTIFICATE OF CORRECTION

PATENT NO. : 8,745,874 B2  Page 1 of 1
APPLICATION NO. : 13/467524
DATED : June 10, 2014
INVENTOR(S) : Kubota et al.

It is certified that error appears in the above-identified patent and that said Letters Patent is hereby corrected as shown below:

On the Title Page Item [56] (OTHER PUBLICATIONS), Page 2, Line 4, delete "Aug. 29, 2009" and insert -- Aug. 28, 2009 --, therefor.

In the Specification

Column 1, Line 8, delete "Jun. 8, 2008" and insert -- Jun. 4, 2008 --, therefor.

Signed and Sealed this
Sixth Day of January, 2015

Michelle K. Lee
*Deputy Director of the United States Patent and Trademark Office*